(12) United States Patent
Nakajima et al.

(10) Patent No.: US 6,908,233 B2
(45) Date of Patent: Jun. 21, 2005

(54) OPTICAL CONNECTOR PLUG, OPTICAL CONNECTOR ADAPTER AND OPTICAL CONNECTOR

(75) Inventors: Masahiro Nakajima, Chiba (JP); Kouji Minami, Tokyo (JP); Junji Taira, Tokyo (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/651,517

(22) Filed: Aug. 29, 2003

(65) Prior Publication Data

US 2004/0072454 A1 Apr. 15, 2004

(30) Foreign Application Priority Data

Sep. 6, 2002 (JP) ........................................ 2002-260761
Mar. 28, 2003 (JP) ........................................ 2003-091985

(51) Int. Cl.[7] ................................................. G02B 6/36
(52) U.S. Cl. ........................................................ 385/53
(58) Field of Search ............................................ 385/53

(56) References Cited

U.S. PATENT DOCUMENTS 5,293,582 A * 3/1994 Beard et al. .................. 385/78
6,517,252 B2 * 2/2003 Yamaguchi ................... 385/53
2001/0041030 A1 * 11/2001 Chen et al. .................... 385/88

* cited by examiner

Primary Examiner—Javaid H. Nasri
(74) Attorney, Agent, or Firm—Adams & Wilks

(57) ABSTRACT

To provide an optical connector promoting reliability by reducing insertion loss of an optical fiber and downsized, there is provided an optical connector plug having a ferrule including a cylindrical member for the ferrule for holding an optical fiber and a flange member provided at a rear end portion of the cylindrical member for the ferrule, an urge spring provided on a side of a rear end portion of the flange member of the ferrule, and a plug housing for holding the ferrule and the urge spring directly at inside thereof and directly engaged with an optical connector adapter inserted with a front end portion of the ferrule to carry out optical connection, in which the plug housing is formed with a slit capable of inserting the optical fiber in a radius direction thereof at a portion of an outer periphery thereof over an axial direction.

25 Claims, 17 Drawing Sheets

OPTICAL CONNECTOR PLUG, OPTICAL CONNECTOR ADAPTER AND OPTICAL CONNECTOR

BACKGROUND OF THE INVENTION

1. Field of the Invention

The present invention relates to an optical connector plug and an optical connector adapter as well as an optical connector for holding a front end of an optical fiber and optically connecting the optical fibers.

2. Description of the Related Art

In a related art, optical connection of optical fibers used in optical communication is carried out by a method of using an optical connector having an optical connector plug holding a front end of the optical fiber and an optical connector adapter for carrying out optical connection of the optical fibers by fixing the optical connector plugs, or a method of welding front end faces of the optical fibers.

According to the optical connection of the optical fibers achieved by a welding process, there a problem that attachment and detachment of the optical connection of the optical fibers cannot be carried out and a problem that the welding steps are complicated, thereby restricting the use of the optical connector.

Further, according to an optical connector of an SC type, an FC type or the like for carrying out optical connection by using a cylindrical member for a ferrule holding an optical fiber and having an outer diameter of $\phi 2.5$ mm, the optical connector cannot be downsized and a wide mounting area is needed in mounting the optical connector to a mounting board.

Therefore, there has been proposed an MU type optical connector using a cylindrical member for a ferrule holding an optical fiber and having an outer diameter of $\phi 25$ mm and comparatively downsized (for example, refer to nonpatent literature 1 described below).

According to the MU type optical connector, an optical connector plug and an optical connector adapter are difficult to disengage from each other and reliability of optical connection can be promoted. However, such an MU type optical connector is generally designed to carry out optical connection using an optical fiber cord provided with a tension member and a coating further on an outer periphery of an optical fiber core line provided with a coating on an outer periphery of an optical fiber to carry out optical connection at a panel face on an outer side of an optical transmission apparatus. Therefore, a number of parts is large and downsizing thereof is difficult. Therefore, a wide mounting are is needed for mounting a comparatively small-sized MU type optical connector at a mounting board and there poses a problem that downsizing of the mounting board per se cannot be achieved.

Further, when the optical connector of the related art is mounted to the mounting board, the optical adapter is directly fixed to the mounting board and therefore, a space for attaching and detaching the optical connector plug holding the optical fiber is needed on the mounting board and there poses a problem that not only the mounting board is large-sized but also operational efficiency is poor.

Further, there is a problem that the conventional optical connector has a large number of parts and that integration of the optical connector flag and the optical connector adapter of the conventional optical connector is difficult to achieve.

In order to resolve such a problem, there has been proposed an optical connector for urging to hold a ferrule holding an optical fiber to a side of a front end face thereof in an axial direction by a leaf spring fixed to a mounting board to thereby bring the front end faces of the ferrules into contact with each other by predetermined pressure (for example, refer to patent literatures 1 and 2).

Patent Literature 1

JP-A-2-259708 (pages 1 through 2, FIGS. 1 through 3)

Patent Literature 2

JP-UM-A-6-73705 (page 5, FIG. 1)

Nonpatent Literature 1

Japanese Industrial Standards (JIS) C5983 F14 type connector

However, according to the above-described optical connector using the leaf spring, there poses a problem that owing to durability performance of the leaf spring, when attachment and detachment are repeated, durability of the leaf spring is deteriorated, a deterioration in opposing connection of optical fibers, that is, a deterioration in insertion loss is brought about and therefore, a number of times of attachment and detachment is restricted.

Further, according to the above-described optical connector using the leaf spring, since there is no means for restricting movement of the ferrule holding the front end of the optical fiber in a rotating direction centering on an axis thereof, an eccentric direction of the core of the optical fiber cannot be prescribed and the inserting loss is increased by bringing about an eccentric shift of the core.

Further, according to the above-described optical connector using the leaf spring, there poses a problem that the ferrule is liable to disengage from the leaf spring by vibration and impact and the reliability is poor.

Further, according to the above-described optical connector using the leaf spring, the front end portion of the cylindrical body for ferrule is directly inserted into a sleeve for optical connection and therefore, there poses a problem that a defect is liable to be brought about at the polished front end face of the cylindrical member for ferrule when an inserting angle is large or by repeating attachment and detachment, the inserting loss in optical connection is liable to increase and the reliability is poor.

SUMMARY OF THE INVENTION

It is an object of the invention to provide an optical connector which promotes reliability by reducing insertion loss of an optical fiber and which is downsized.

In order to resolve the above-described problem, according to a first aspect of the invention, there is provided an optical connector plug comprising a ferrule including a cylindrical member for the ferrule for holding an optical fiber and a flange member provided at a rear end portion of the cylindrical member for the ferrule, an urge spring provided on a side of a rear end portion of the flange member of the ferrule, and a plug housing for holding the ferrule and the urge spring directly at inside thereof and directly engaged with an optical connector adapter inserted with a front end portion of the ferrule to carry out optical connection, wherein the plug housing is formed with a slit capable of inserting the optical fiber in a radius direction thereof at a portion of an outer periphery thereof over an axial direction.

According to a second aspect of the invention, there is provided the optical connector plug according to the first aspect, wherein the rear end portion of the flange member is provided with an engaging portion for engaging with the plug housing and the plug housing includes a holding hole for holding the ferrule in a state of being urged by the urge spring to a front end side in the axial direction by engaging with the engaging portion of the flange member and a first rotation stopper portion engaged with the flange member for restricting movement of the ferrule in a rotating direction centering on an axis thereof.

According to a third aspect of the invention, there is provided the optical connector plug according to the second aspect, wherein the first rotation stopper portion of the plug housing is provided to be able to change relative positions of the plug housing and the ferrule in a state in which the ferrule is pushed against the urge spring.

According to a fourth aspect of the invention, there is provided the optical connector plug according to any one of the first through the third aspects, wherein the flange member is engaged with the optical connector adapter to restrict the ferrule from moving in the rotating direction centering on the axis of the ferrule.

According to a fifth aspect of the invention, there is provided the optical connector plug according to any one of the second through the fourth aspects, wherein the flange member includes an outer periphery a section of which is rectangular, and the ferrule is restricted from moving in the rotating direction by bringing the first rotation stopper portion into contact with two faces of an outer peripheral face of the flange member on one side opposed to each other and bringing two faces of the flange member on other side into contact with the optical connector adapter.

According to a sixth aspect of the invention, there is provided the optical connector plug according to any one of the first through the fourth aspects, wherein the outer peripheral face of the flange member is provided with an urge spring engaging projection projected over the circumferential direction for engaging with the urge spring.

According to a seventh aspect of the invention, there is provided the optical connector plug according to any one of the first through the sixth aspects, wherein an outer diameter of the cylindrical member for the ferrule is 1.25 mm.

According to an eighth aspect of the invention, there is provided an optical connector including the optical connector plug according to any one of the first through the seventh aspects.

According to a ninth aspect of the invention, there is provided an optical connector adapter comprising a sleeve for optical connection inserted with ferrules holding optical fibers from sides of both ends thereof for bringing end faces of the ferrules into contact with each other to be connected optically, and an adapter housing holding the sleeve for optical connection and optically coupling optical connector plugs held by the ferrules, wherein an outer periphery of the adapter housing is provided with a first mount engaging portion attachably and detachably engaging with a mounting board or amounting member attachably and detachably fixed to the mounting board to project from one face thereof.

According to a tenth aspect of the invention, there is provided the optical connector adapter according to the ninth aspect, wherein the adapter housing comprising a housing main body provided by integral molding to open a sleeve inserting hole inserting to hold the sleeve for optical connection on one side of a side face thereof, and a lid member fitted to the sleeve inserting hole of the housing main body, wherein the lid member is integrally provided with the first mount engaging portion projected to a side of other face of the housing main body.

According to an eleventh aspect of the invention, there is provided the optical connector adapter according to the tenth aspect, wherein engagement of the lid member by the first mount engaging portion is disengaged by an attaching and detaching jig.

According to a twelfth aspect of the invention, there is provided the optical connector adapter according to the eleventh aspect, wherein the attaching and detaching jig is, provided with a shape of a pin and the engagement is disengaged by elastically deforming the first mount engaging portion by inserting the attaching and detaching jig between the first mount engaging portion and the housing main body.

According to a thirteenth aspect of the invention, there is provided the optical connector adapter according to the ninth aspect, wherein the adapter housing is formed by integral molding and the one face of the adapter housing is provided with a sleeve inserting hole for inserting the sleeve for optical connection.

According to a fourteenth aspect of the invention, there is provided the optical connector according to any one of the ninth through the thirteenth aspects, wherein an inner side of an outer edge of an opening of the sleeve inserting hole is provided with a projection of the sleeve brought into contact with an outer peripheral face of the sleeve for optical connection for preventing detachment from the sleeve inserting hole.

According to a fifteenth aspect of the invention, there is provided the optical connector adapter according to any one of the ninth through the fourteenth aspects, wherein the side of the other face of the adapter housing is provided with a second mount engaging portion for engaging with the first mount engaging portion of other one of the adapter housing.

According to a sixteenth aspect of the invention, there is provided the optical connector adapter according to the fifteenth aspect, wherein a plurality of pieces of the adapter housings are laminated.

According to a seventeenth aspect of the invention, there is provided the optical connector adapter according to any one of the ninth through the sixteenth aspects, wherein the adapter housing is provided with a second rotation stopper portion engaged with an outer periphery of the ferrule for restricting the ferrule from moving in a rotating direction.

According to an eighteenth aspect of the invention, there is provided an optical connector comprising the optical connector adapter according to any one of the ninth through the seventeenth aspects.

According to a nineteenth aspect of the invention, there is provided an optical connector comprising a ferrule comprising a cylindrical member for the ferrule holding a front end of an optical fiber and a flange member fitted to a rear end portion thereof and including an engaging portion on a side of a rear end portion of the flange member, an optical connector plug comprising an urge spring provided on the side of the rear end portion of the flange member of the ferrule, and a plug housing directly holding the ferrule in a state of being urged to a side of a front end thereof in an axial direction by the urge spring by being engaged with the engaging portion of the ferrule and provided with a slit capable of inserting the optical fiber in a radius direction thereof at a portion of an outer periphery thereof over the axial direction and an optical connector adapter comprising a sleeve for optical connection inserted with the cylindrical members for the ferrules from sides of both ends thereof for bringing end faces of the cylindrical members for the ferrules into contact with each other to optically connect, and an adapter housing holding the sleeve for optical connection and having a shape for optically coupling the optical connector plugs, wherein the plug housing and the adapter housing are formed with engaging portions for engaging the plug housing and the adapter housing with each other, an outer periphery of the adapter housing is provided with a first mount engaging portion for attachably and detachably engaging with a mounting board or a mounting member fixed attachably and detachably to the mounting board to project from one face thereof.

According to a twentieth aspect of the invention, there is provided the optical connector according to the nineteenth aspect, wherein the plug housing is provided with a first rotation stopper portion engaged with the flange member for restricting the ferrule from moving in a rotating direction centering on an axis thereof and the adapter housing is provided with a second rotation stopper portion engaged with the flange member of the optical connector plug engaged with the adapter housing for restricting the ferrule from moving in the rotating direction centering on the axis of the ferrule.

According to a twenty-first aspect of the invention, there is provided the optical connector according to the twentieth aspect, wherein the flange member is provided with an outer periphery having a section in a rectangular shape and the ferrule is restricted from moving in the rotating direction by bringing the first rotation stopper portion into contact with two faces on one side of an outer peripheral face of the flange member opposed to each other and bringing the second rotation stopper portion into contact with two faces on other side of the outer peripheral face of the flange member opposed to each other.

According to a twenty-second aspect of the invention, there is provided the optical connector according to any one of the nineteenth through twenty-first aspects, wherein the plug housing and the adapter housing are provided with engagement restricting portions for restricting engaging positions in the rotating direction centering on axes thereof.

According to the invention, fabrication cost can be reduced and an integrating step can be simplified by reducing a number of parts of the optical connector comprising the optical connector plug and the optical connector adapter. Further, the reliability can be promoted without restricting a number of times of attachment and detachment of the optical connector plug and the optical connector adapter and without damaging a front end face of the optical fiber. Further, by providing the mounting member attachable and detachable to and from the optical connector adapter at the optical connector, it is not necessary to attach and detach the optical connector adapter and the optical connector plug on the mounting board and the mounting board can be downsized.

DETAILED DESCRIPTION OF THE PREFERRED EMBODIMENTS

The invention will be explained in details based on embodiments as follows.

(Embodiment 1)

Figure 1:
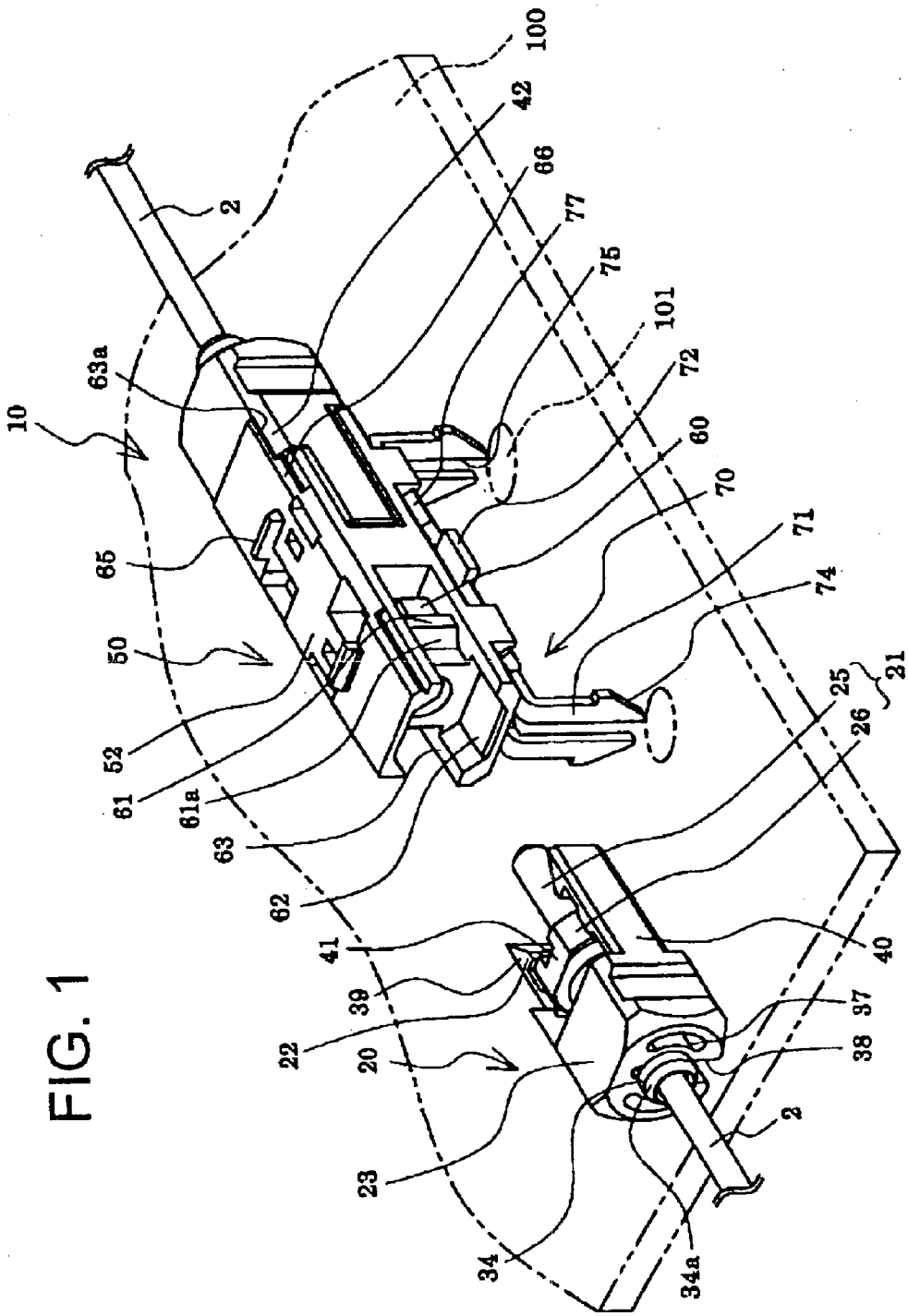
FIG. 1 is a perspective view showing a step of mounting an optical connector according to Embodiment 1 of the invention.
Figure 2A:
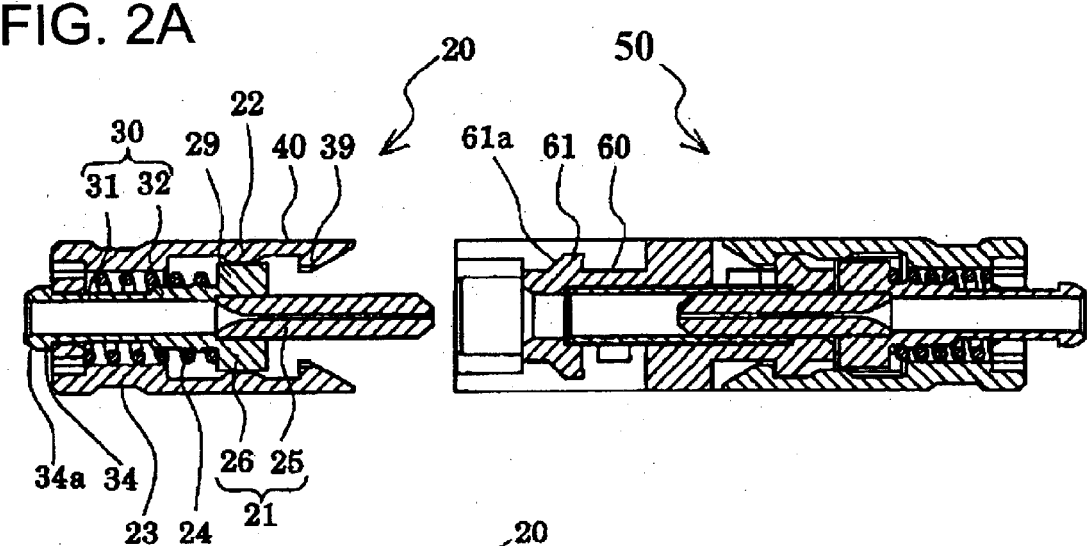
FIGS. 2A, 2B and 2C are sectional views of the optical connector according to Embodiment 1.
Figure 2B:
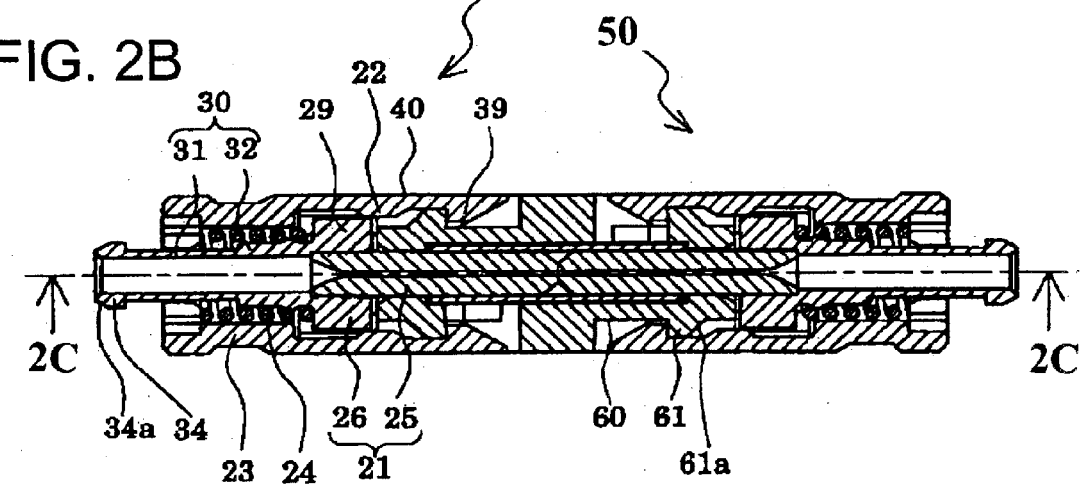
Figure 2C:
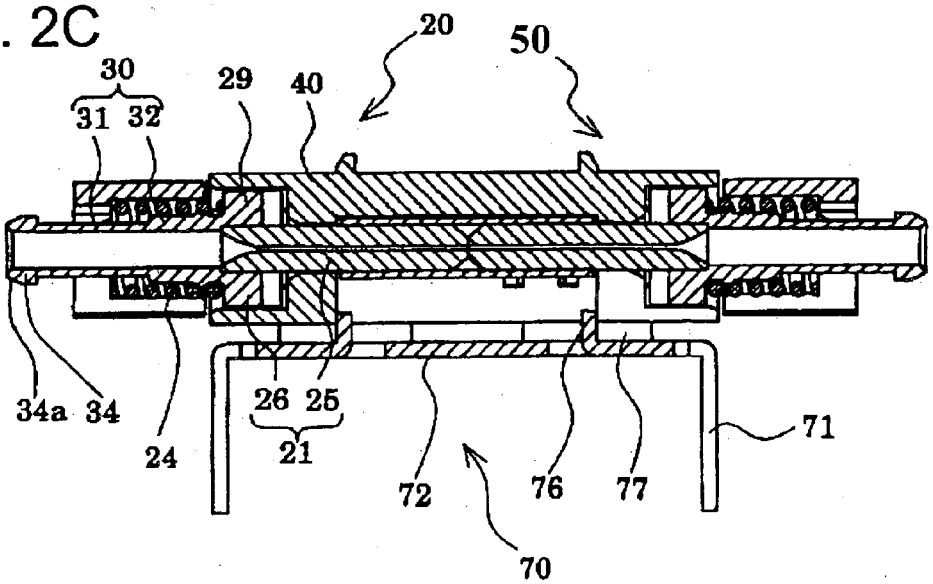
Figure 3A:
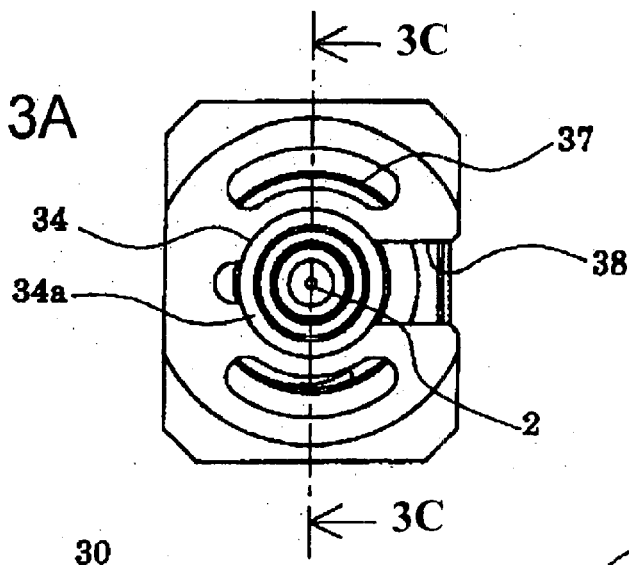
FIGS. 3A, 3B and 3C are plane views and a sectional view of an optical connector plug according to Embodiment 1 of the invention.
Figure 3B:
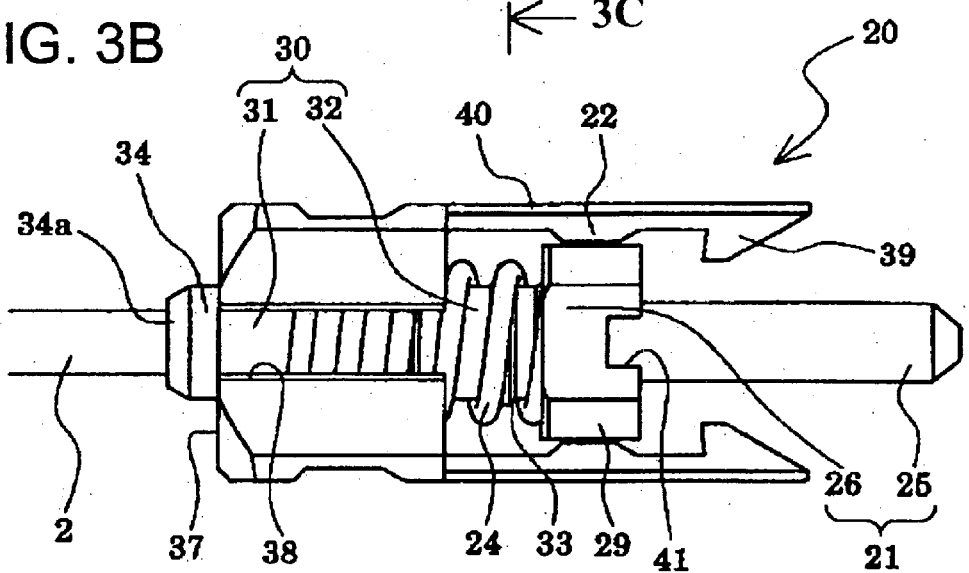
Figure 3C:
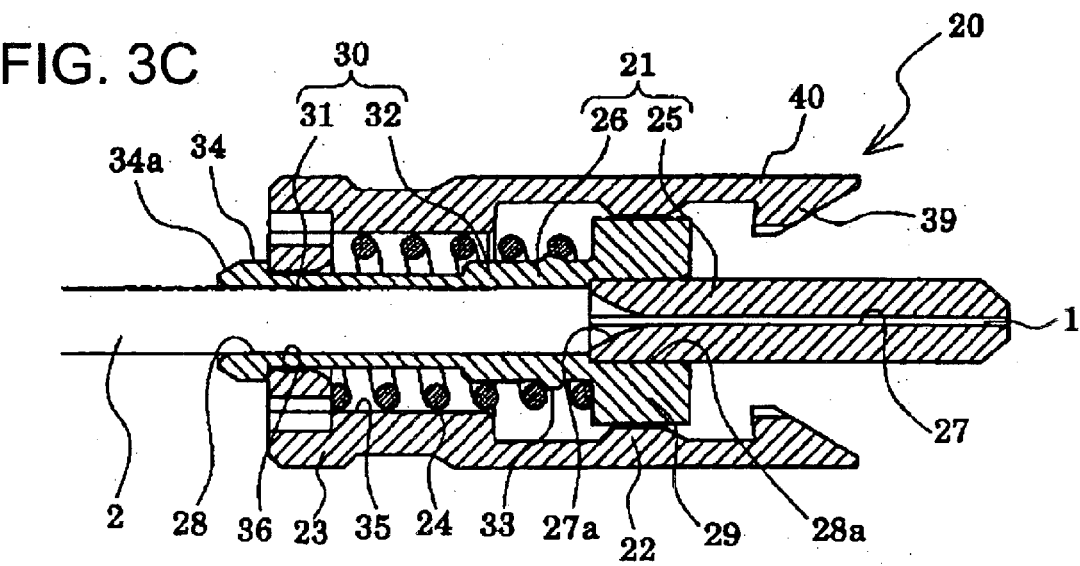
Figure 4:
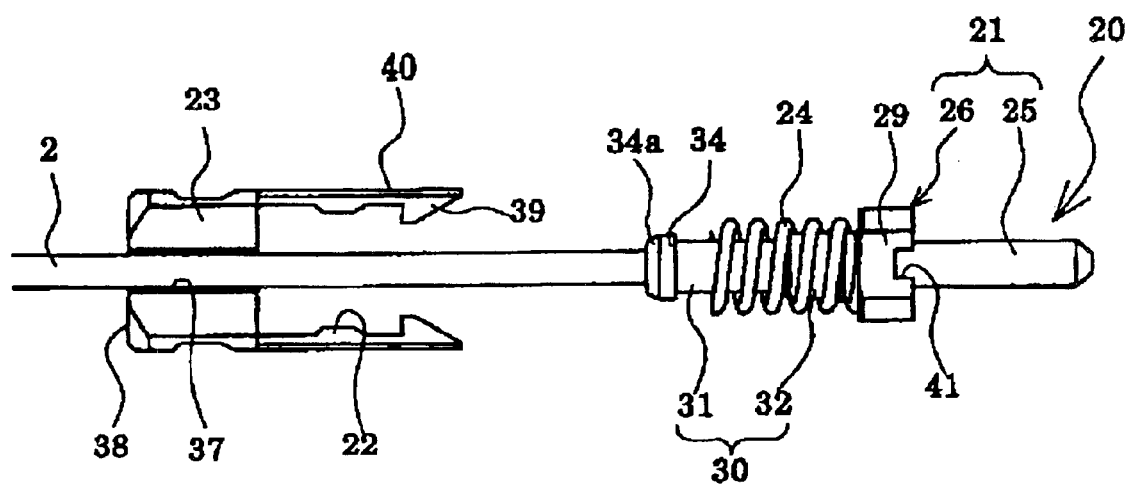
FIG. 4 is a plane view showing a step of integrating the optical connector plug according to Embodiment 1 of the invention.

FIG. 1 is a perspective view showing a step of mounting an optical connector according to Embodiment 1, FIG. 2A is a sectional view showing a step of connecting the optical connector, FIG. 2B is a sectional view showing a state of connecting the optical connector, FIG. 2C is a sectional view taken along a line 2C—2C of FIG. 2B, FIGS. 3A and 3B are plane views of an optical connector plug, FIG. 3C is a sectional view taken along a line 3C—3C of FIG. 3A and FIG. 4 is a plane view showing a step of integrating the optical connector plug.

As illustrated, an optical connector jig 10 comprises an optical connector plug 20, an optical connector adapter 50 and a mounting member 70.

The optical connector plug 20 is constituted by a ferrule 21 for holding an optical fiber 1, a plug housing 23 for directly holding the ferrule 21 movably in an axial direction in a predetermined range and provided with a first rotation stopper portion 22 for restricting movement in a rotating direction, and a biasing or urge spring 24 for urging the ferrule 21 to a side of a front end face in the axial direction thereof.

The ferrule 21 includes a ferrule cylindrical member 25 and a flange member 26 provided at a rear end portion of the ferrule cylindrical member 25.

The ferrule cylindrical member 25 is provided with a cylindrical shape and includes an optical fiber inserting hole 27 capable of inserting the optical fiber 1 by penetrating in the axial direction at inside thereof. A rear end portion of the optical fiber inserting hole 27 is provided with a taper portion 27a an inner diameter of which is gradually increased to an opening side. By providing such a taper portion 27a, when the optical fiber 1 is inserted into the optical fiber inserting hole 27, a front end of the optical fiber 1 can be prevented from being chipped or broken by being brought into contact with an end face of the ferrule cylindrical member 25.

Further, as a material of the ferrule cylindrical member 25, for example, a ceramics material of zirconia or the like, a plastic material, a glass material of crystallized glass, borosilicate glass, quartz or the like, a metal material of stainless steel, nickel or the like can be pointed out. Further, an outer diameter of the ferrule cylindrical member 25 is set to 1.25 mm according to the embodiment.

The flange member 26 includes an optical fiber core line inserting hole 28 communicating with the optical fiber inserting hole 27 of the ferrule cylindrical member 25 and capable of inserting an optical fiber core line 2 having a coating at an outer periphery of the optical fiber 1. A side of a front end portion of the optical fiber core line inserting hole 28 constitutes a fitting hole 28a formed by an inner diameter of a size substantially equivalent to an outer diameter of the ferrule cylindrical member 25 and fixedly attached to a rear end portion of the ferrule cylindrical member 25 by press-fitting or adherence.

Further, an outer periphery on a side of a front end portion of the flange member 26 includes a flange portion 29 projected in a rectangular shape over a circumferential direction. The flange portion 29 is engaged with a first rotation stopper portion 22 of the plug housing 23 to be mentioned later in details to restrict the movement of the ferrule 21 in the rotating direction centering on an axis thereof.

Further, an inserting portion 30 capable of inserting the urge spring 24 is extended on a rear die of the flange member 26. The inserting portion 30 is constituted by a small diameter portion 31 an outer diameter of which is comparatively small on a side of a rear end portion thereof and a large diameter portion 32 an outer diameter of which is larger than that of the small diameter portion 31 on a side of the flange portion 29.

An outer periphery of the large diameter portion 32 of the inserting portion 30 is provided with a projection for spring 33 engaging with the urge spring 24 by being projected over a circumferential direction thereof.

Further, an outer periphery of the small diameter portion 31 of the inserting portion 30 is provided with an engaging projection 34 an outer diameter of which is substantially equivalent to that of the large diameter portion 32 over a circumferential direction thereof and an inclined taper face 34a is constituted by a face on a side of a rear end portion of the engaging projection 34. The taper face 34a provided at the engaging portion 34 is for inserting the inserting portion 30 of the flange member 26 into an engaging hole 36 of the plug housing 23, mention later, while pushing to widen the engaging hole 36 in inserting thereinto.

Further, according to the embodiment, the flange member 26 is formed by a metal of stainless steel or the like. Further, the material and a method of fabricating the flange member 26 are not particularly limited thereto but, for example, the flange member 26 may integrally be molded to a rear end portion of the ferrule cylindrical member 25 by plastic.

Further, the urge spring 24 of a compression spring or the like is provided at an outer periphery of the inserting portion 30 of the flange member 26. The urge spring 24 is engaged with the projection for spring 33 provided at the large diameter portion 32 of the inserting portion 30 to thereby temporarily prevent the urge spring 24 from being detached from the ferrule 21.

Meanwhile, the plug housing 23 comprises, for example, plastic or the like and is provided with a ferrule holding hole 35 for holding the ferrule 21 and the urge spring 24 by penetrating in the axial direction.

A rear end portion of the ferrule holding hole 35 is provided with the engaging hole 36 having an inner diameter larger than the small diameter portion 31 of the flange member 26 and smaller than the engaging projection 34.

By inserting the small diameter portion 31 of the inserting portion 30 of the flange member 26 into the engaging hole 36, the ferrule 21 is held in the plug housing 23 movably in the axial direction by a predetermined amount.

That is, when the inserting portion 30 of the flange member 26 is inserted into the engaging hole 36, the engaging projection 34 having an outer diameter larger than the engaging hole 36 pushes to widen the engaging hole 36 to elastically deform. When the engaging projection 34 has passed through the engaging hole 36, the inner diameter of the engaging hole 36 recovers to the original inner diameter and the engaging projection 34 is brought into contact with the rear end face of the plug housing 23 at which the engaging hole 36 is opened to thereby hold the ferrule 21 to the plug housing 23 in a state in which movement thereof on a side of a front end face thereof is restricted.

Further, the urge spring 24 held at an outer peripheral face of the inserting portion 30 of the flange member 26 of the ferrule 21 urges the ferrule 21 to a front end side in the axial direction of the plug housing 23 by bringing one end thereof into contact with the flange portion 29 and bringing other end thereof into contact with an inner face thereof at which the engaging hole 36 is opened.

Further, as described above, the ferrule 21 urged to the front end side in the axial direction by the urge spring 24 is held in the state in which the ferrule 21 is urged to the front end face side by restricting the movement to the front end side in the axial direction by bringing the engaging projection 34 provided at the flange member 26 into contact with the rear end face of the plug housing 23 at which the engaging hole 36 is opened.

Further, since the engaging hole 36 of the plug housing 23 is pushed to widen to the engaging projection 34 when the inserting portion 30 of the flange member 26 is inserted thereinto, two intermittent opening portions 37 are provided at the rear end portion of the plug housing 23 at which the engaging hole 36 is provided over a circumferential direction at a surrounding of the engaging hole 36. The surrounding of the engaging hole 36 is liable to be deformed elastically by the opening portions 37 and the inserting portion 30 of the flange member 26 is facilitated to be inserted into the engaging hole 36.

Further, an outer peripheral face of the plug housing 23 is provided with as lit for optical fiber 38 for communicating the ferrule holding hole 35 to outside over the axial direction. The slit for optical fiber 38 is formed by a width larger than diameters of the optical fiber 1 and the optical fiber core line 2 held by the ferrule 21 and more or less smaller than the outer diameter of the small diameter portion 31 of the flange member 26.

In integrating the optical connector plug 20, the slit for optical fiber 38 simplifies the integration by attaching the plug housing plug 23 to the ferrule 21 holding the optical fiber land the optical fiber core line 2 later without previously inserting the optical fiber 1 and the optical fiber core line 2 into the plug housing 23.

By providing the slit for optical fiber 38 to the plug housing 23 in this way, it is not necessary to previously insert the optical fiber 1 into the plug housing 23 and therefore, the yield can be promoted by preventing the optical fiber 1 from being broken or damaged.

Further, the plug housing 23 is provided with a pair of claw portions 40 to interpose the ferrule 21 and provided with locking claws 39 at inner faces of front end portions thereof opposed to each other.

The claw portions 40 are for engaging the optical connector plug 20 and the optical connector adapter 50 by being engaged with an adapter housing 52 of the optical connector adapter 50 to be mentioned later in details.

Further, regions of the respective claw portions 40 opposed to the flange portion 29 are respectively provided with the first rotation stopper portions 22 provided to project to be brought into contact with respectives of the pair of faces of the outer peripheral face of the flange portion 29 opposed to each other.

The first rotation stopper portions 22 provided at respectives of the claw portions 40 are brought into contact with the pair of faces of the outer peripheral face of the flange portion 29 opposed to each other, that is, by interposing the flange portion 29 by the first rotation stopper portions 22 provided at the pair of claw portions 40, movement of the ferrule 21 in the rotating direction centering on the axis is restricted relative to the plug housing 23.

Further, the pair of claw portions 40 are formed at an interval by which inner faces thereof opposed to each other on a side of the rear end portion of the first rotation stopper portion 22 is not brought into contact with the flange portion 29 when the flange portion 29 is rotated.

That is, when the ferrule 21 of the optical connector plug 20 is pressed to the side of the rear end portion in the axial direction against urge force of the urge spring 24, engagement between the first rotation stopper portion 22 and the flange portions 29 is disengaged and the ferrule 21 can be rotated relative to the plug housing 23. Thereby, even after integrating the ferrule 21 and the plug housing 23, positioning of the ferrule 21 in the rotating direction can be carried out by an eccentric direction of the optical fiber 1, and insertion loss can be reduced by matching eccentric directions of the optical connector plugs 20 when the optical connector plugs 20 are oppositely connected by the optical connector adapter 50 to be mentioned later in details.

Further, according to the embodiment, a groove portion 41 having a predetermined depth is formed at a front end face of the flange portion 29 and the ferrule 21 may be pressed to the rear end portion side and rotate in a pressed state by a jig engaged with the groove portion 41, although not particularly illustrated.

Further, as shown by FIG. 1, one of edge portions of one of the claw portions 40 is provided with an engagement restricting portion 42 to be engaged with an engagement restricting recess portion 63a of the optical connector adapter 50, mentioned later.

By providing the engagement restricting portion 42 only at one of the edge portions of one of the claw portions 40, the engagement restricting portion 42 can restrict a position of engaging the optical connector plug 20 to the optical connector adapter 50 in the rotating direction centering on the axis. That is, when the optical connector plug 20 is engaged with the optical connector adapter 50, the optical connector plug 20 and the optical connector 50 can be engaged with each other always at the same rotating position. Thereby, when the optical connector plugs 20 are opposedly connected, eccentric directions of the optical fibers 1 are not different from each other and the insertion loss can be prevented from increasing.

As a method of integrating the optical connector plug 20, first, the ferrule 21 is formed by fixing the flange member 26 to the rear end portion of the ferrule cylindrical member 25 by press-fitting. Next, by inserting the inserting portion 30 of the flange member 26 into the urge spring 24, the urge spring 24 is engaged with the projection for spring 33 provided on the large diameter portion 32 and the urge spring 24 is tackedly fixed or integrally mounted to the outer peripheral face of the inserting portion 30.

Next, the ferrule 21 integrally mounted or tackedly fixed with the urge spring 24 is adhered with the optical fiber 1 and the optical fiber core line 2 via a thermosetting type adhering agent. A front end face of the ferrule 21 holding the optical fiber 1 and the optical fiber core line 2 in this way is polished by a polishing apparatus or the like along with a front end face of the optical fiber 1.

Thereafter, as shown by FIG. 4, the optical fiber core line 2 held by the ferrule 21 is inserted into the slit for optical fiber 38 of the plug housing 23 and the inserting portion 30 of the flange member 26 is inserted into the engaging hole 36 of the plug housing 23. At this occasion, the inserting portion 30 is inserted into the engaging hole 36 while pressing to widen the engaging hole 36 by the engaging projection 34 and the engaging projection 34 is engaged with the engaging hole 36 in the state in which movement to the front end side is restricted.

Thereby, the optical connector plug 20 according to the embodiment can be constituted by holding the ferrule 21 movably in the axial direction by a predetermined amount in the ferrule holding hole 35 of the plug housing 23 in the state in which the ferrule 21 is urged to the front end side in the axial direction and the movement in the rotating direction centering on the axis is restricted by the first rotation stopper portions 22 of the claw portions 40.

Since the optical connector plug 20 is constituted only by the ferrule 21, the urge spring 24 and the plug housing 23 in this way, fabrication cost can be reduced by reducing a number of parts. Further, a procedure of integrating the optical connector plug 20 can be simplified since the urge spring 24 can tackedly be fixed to the rear end portion of the ferrule 21 and the plug housing 23 can be fixed to the ferrule 21 after fixing the optical fiber 1 to the ferrule 21.

Further, a comparison of dimensions and numbers of parts between the optical connector plug 20 having such a constitution and the MU type optical connector plug (JIS C5983 F14 type optical connector) of the related art is shown in Table 1 shown below.

TABLE 1

|  | embodiment 1 | related art |
| --- | --- | --- |
| total length (mm) | 12.8 | 35 |
| width (mm) | 4.5 | 6.6 |
| height (mm) | 3.6 | 4.35 |
| number of parts | 4 | 7 |

As shown by Table 1, a number of parts of the optical connector plug 20 of Embodiment 1 is smaller than that of the MU type optical connector plug of the related art and all of the total length, the width and the height can be downsized. Thereby, downsizing of the optical connector 10 using the optical connector plug 20 can be achieved and when the optical connector 10 is mounted to a mounting board, high density formation can be achieved.

Further, the optical connector 10 using the optical connector plug 20 optically connects the optical fiber core lines 2 provided with coatings at outer peripheries of the optical fibers 1 above a mounting board 100 and therefore, it is not necessary to use an optical fiber cable provided with a tension member and a coating at the outer periphery of the optical fiber core line 2 and downsizing can be carried out also thereby.

Next, the optical connector adapter 50 of the optical connector 10 will be explained in details.

Figure 5A:
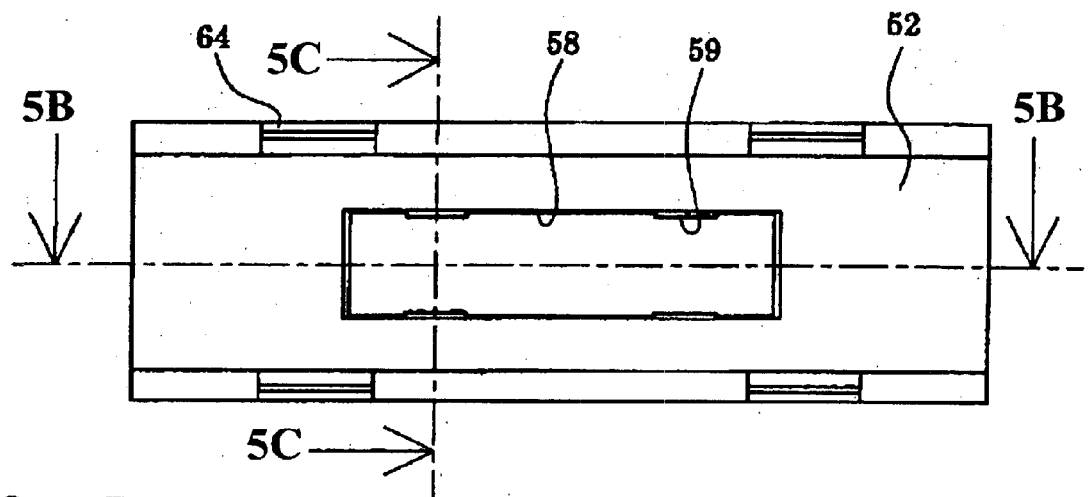
FIGS. 5A, 5B and 5C are a plane view and sectional views of an optical connector adapter according to Embodiment 1 of the invention.
Figure 5B:
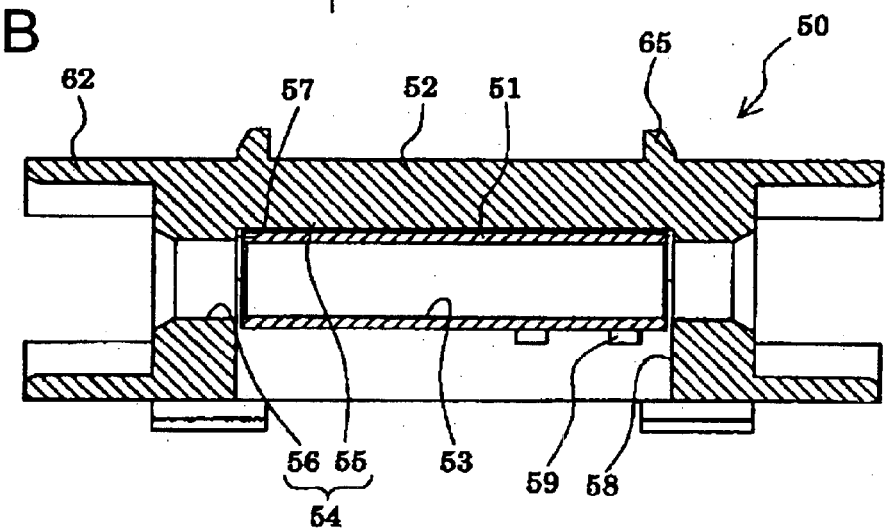
Figure 5C:
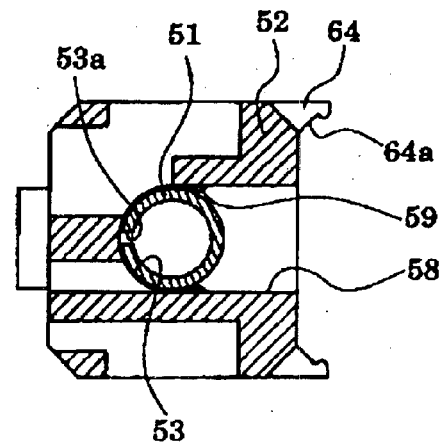
Figure 6A:
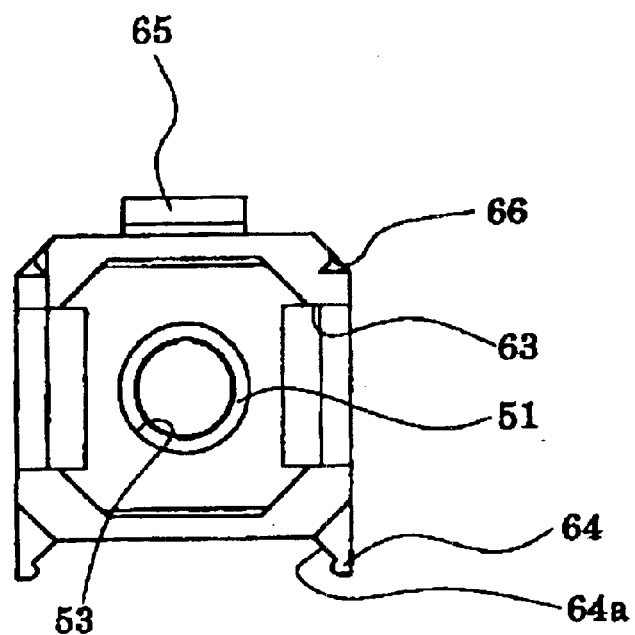
FIGS. 6A and 6B are plane views of the optical connector adapter according to Embodiment 1 of the invention.
Figure 6B:
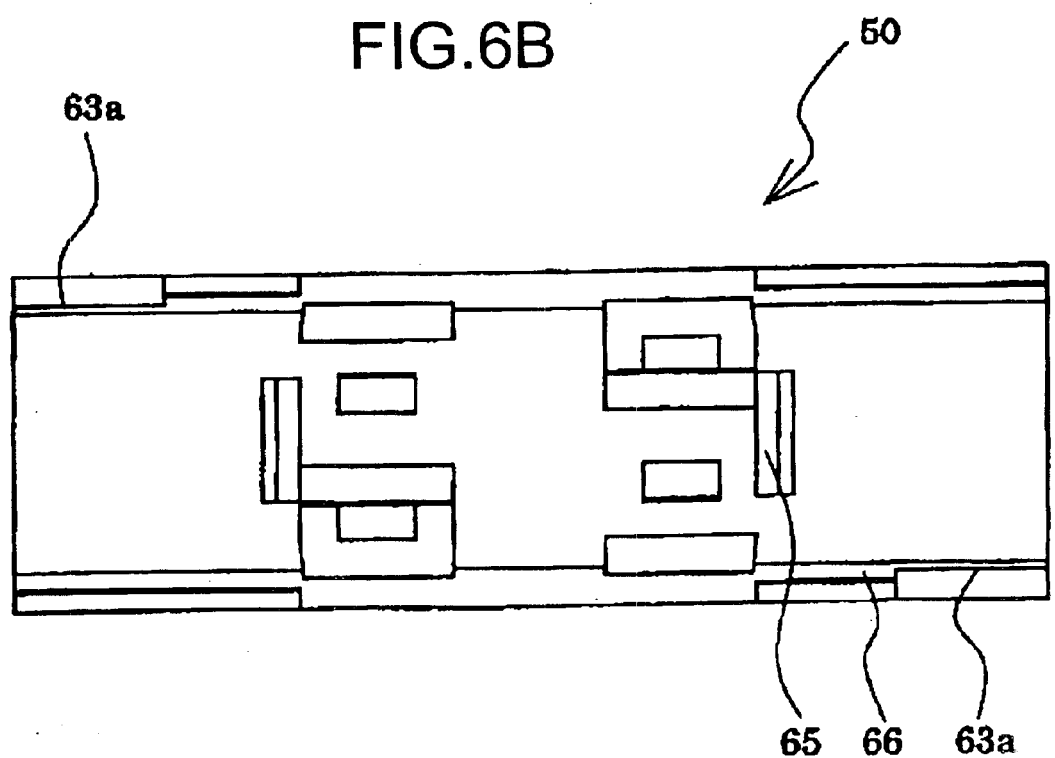

FIG. 5A is a plane view from a side of a bottom face of the optical connector adapter, FIG. 5B is a sectional view taken along a line 5B—5B of FIG. 5A, FIG. 5C is a sectional view taken along a line 5C—5C of FIG. 5A and FIGS. 6A and 6B are plane views from a side of an end face and a side of an upper face of the optical connector adapter.

As shown by FIGS. 5A, 5B and 5C, the optical connector adapter 50 is constituted by a sleeve for optical connection 51 inserted with the front end portion of the ferrule cylindrical member 25 and the adapter housing 52 including the sleeve for optical connection 51.

The sleeve for optical connection 51 is provided with a cylindrical shape and includes a ferrule inserting hole 53 provided by penetrating in an axial direction thereof and a streak of slit 53a provided from one end side to other end side in the longitudinal direction. Further, the ferrule inserting hole 53 is formed by an inner diameter more or less smaller than an outer diameter of the cylindrical member for ferrule 25.

Optical connection is carried out by respectively inserting front end portions of the cylindrical members for ferrule 25 from openings on both sides of the ferrule inserting hole 53 of the sleeve for optical connection 51. At this occasion, the sleeve for optical connection 51 is elastically deformed in a direction of expanding the slit 53a by inserting the front end portions of the cylindrical members for ferrule 25 and therefore, the front end portions of the cylindrical members for ferrule 25 can opposedly be connected by being brought into close contact with the inner face of the ferrule inserting hole 53 to hold.

Further, as a material of the sleeve for optical connection 51, for example, a ceramic material of zirconia or the like or a metal material of copper alloy or the like can be pointed out.

Further, the adapter housing 52 is formed by, for example, integrally molding a resin of plastic or the like and is provided with a through hole 54 for holding the sleeve for optical connection 51 by penetrating in the axial direction.

The cylindrical members for ferrule 25 are inserted from the both end sides of the through hole 54 to be inserted into the sleeve for optical connection 51 held in the through hole 54.

That is, the through hole 54 is provided with a sleeve holding portion 55 having a diameter more or less larger than the outer diameter of the sleeve for optical connection 51 substantially on a central side thereof and communication holes 56 each having an inner diameter substantially equivalent to the outer diameter of the cylindrical member for ferrule 25 on both end sides of the sleeve holding portion 55 and a stepped difference portion 57 is provided by a difference between inner diameters of these.

By bringing both end faces of the sleeves for optical connection 51 in contact with the stepped difference portions 57, the sleeve for optical connection 51 is held by the sleeve holding portion 55 in a state in which movement thereof in the axial direction is restricted.

Further, the adapter housing 52 is provided with a sleeve inserting hole 58 formed by a size equivalent to that of the sleeve holding portion 55 for communicating the sleeve holding portion 55 to outside and the sleeve for optical connection 51 is inserted into the sleeve holding portion 55 from the sleeve inserting hole 58.

Further, inner side faces of the sleeve inserting hole 58 opposed to each other are provided with two pairs of projections for sleeve 59 to be opposed to each other which are provided to project such that widths thereof are narrower than that of the sleeve holding portion 55. The projection for sleeve 59 is provided in a taper shape such that an amount of projection thereof is reduced to an opening side of the sleeve inserting hole 58. The sleeve for optical connection 51 inserted from the sleeve inserting hole 58 is inserted into the sleeve holding portion 55 by pressing to widen the two pairs or projections for sleeve 59 and the projections for sleeve 59 are brought into contact with an outer peripheral face of the inserted sleeve for optical connection 51, thereby, the sleeve for optical connection 51 is held in the sleeve holding portion 55 in a state in which movement in a radius direction thereof is restricted.

Further, as shown by FIG. 1 and FIGS. 2A and 2B, at the peripheries of the both end portions of the adapter housing 52, engaging recess portions 60 for engaging with the pair of claw portions 40 of the optical connector plug 20 are provided at respective opposed faces thereof.

The engaging recess portions 60 are formed from both end faces of the adapter housing 52 such that lengths and thickness thereof are substantially equivalent to those of the claw portions 40 and a bottom face of the engaging recess portion 60 is provided with an engaging projection portion 61 projected to a side of an opening face of the engaging recess portion 60. A taper face 61a is formed at a face of the engaging projection portion 61 on a side thereof inserted with the claw portion 40. When the claw portions 40 are inserted into the engagement recess portions 60 from sides of end faces thereof, an interval between the pair of claw portions 40 is pressed to widen by elastically deforming the claw portions 40 by bringing the locking claws 39 into contact with the taper faces 61a of the engaging projection portions 61 and the locking claws 39 passing the engaging projection portions 61 are engaged with the engaging projection portions 61 to there by engage the optical connector plug 20 and the optical connector adapter 50.

Further, both end faces of the adapter housing 52 are provided with second rotation stopper portions 62 for restricting movement in the rotating direction of the ferrule 21 centering on the axis by being engaged with the flange portions 29 of the flange member 26.

The second rotation stopper portions 62 are formed as a communicating hole in a rectangular shape communicating with the communication hole 56 of the through hole 54 and having a size of inserting the flange portions 29 of the flange member 26 and notch portions 63 are formed on sides thereof of the engaging recess portions 60 inserted with the flange portions 29 of the second rotation stopper portion 62. That is, the movement in the rotating direction centering on the axis of the ferrule 21 is restricted by bringing the first rotation stopper portions 22 provided at the claw portions 40 into contact with ones of the outer peripheral faces of the flange portions 29 opposed to each other and bringing the second rotation stopper portions 62 into others of the outer peripheral faces of the flange portions 29 opposed to each other.

That is, the movement in the rotating direction centering on the axis of the ferrule 21 is restricted by engaging the optical connector plug 20 and the optical connector adapter 50 by the claw portions 40 and the engaging recess portions 60.

As shown by FIG. 1 and FIGS. 6A and 6B, one of the edge portions of one of the notch portions 63 is provided with the engagement restricting recess portion 63a to be inserted with the engagement restricting portion 42 of the optical connector plug 20.

The engaging restricting recess portion 63a restricts an engaging position in the rotating direction centering on the axis of the optical connector plug 20 by being provided at one of the edge portions of one of the notch portions 63.

An explanation will be given here of optical connection of the optical connector plugs 20.

As shown by FIG. 2A, one of the optical connector plugs 20 is inserted into one end side of the optical connector adapter 50 for engagement therewith.

More specifically, the claw portions 40 of the optical connector plug 20 are engaged with the engaging recess portions 60 of the optical connector adapter 50. At this occasion, the optical connector plug 20 is provided with the engagement restricting portion 42 only at one of the edge portions of the one of the claw portions 40 and, therefore, the claw portions 40 are engaged with the engagement recess portions 60 such that the engagement restricting portion 42 is inserted into the engagement restricting recess portion 63a of the optical connector adapter 50.

Thereby, the engaging position in the rotating direction of the optical connector plug 20 can be positioned relative to the optical connector adapter 50.

Further, the ferrule 21 held between the optical connector adapter 50 and the optical connector plug 20 which are engaged is held in a state in which movement in the rotating direction centering on the axis is restricted by the first rotation stopper portions 22 and the second rotation stopper portions 62.

The ferrule 21 is urged to be held in a state in which movement on the front end side is restricted by bringing the engaging projection 34 of the inserting portion into contact with the engaging hole 36 and such that movement thereof to the rear end side by pressing can be carried out.

Next, as shown by FIG. 2B, another of the optical connector plugs 20 is inserted into the other end side of the optical connector adapter 50 for engagement therewith.

Furthermore, the engagement between the optical connector adapter 50 and the optical connector plug 20 is carried out by engaging the claw portions 40 and the engagement recess portions 60 similar to the one optical connector plug 20 and the optical connector adapter 50, as described above.

When the other optical connector plug 20 is engaged with the optical connector adapter 50 in this way, by bringing the front end faces of the ferrules 21 into contact with each other, the ferrules 21 are moved to rear end portion sides against the urge or biasing force of the urge springs 24.

In this way, optical connection can be carried out by bringing the ferrules 21 into contact with each other in the state in which the front end faces of the ferrules 21 urged to the front end portion sides by the urge force of the urge springs 24 are pressed by predetermined pressure.

In this way, the optical connector plug 20 and the optical connector adapter 50 can be readily attached to each other and detached from each other by optically connecting the optical connector plugs 20 via the optical connector adapter 50.

Further, the movement of the ferrule 21 in the rotating direction is restricted by the second rotation stopper portion 62 and therefore, the ferrule 21 is not inserted into the sleeve for optical connection 51 in a skewed direction and the front end face of the ferrule 21 is difficult to be damaged. Thereby, not only the insertion loss in optical connection can be reduced but also the reliability can be promoted.

Further, in disengaging the engagement between the optical connector plug 20 and the optical connector adapter 50, the engagement may be disengaged by widening the claw portions 40 of the optical connector plug 20 by a jig although not particularly illustrated.

Further, one face of the adapter housing 52 is provided with a mount engaging portion 64 for engaging with the mounting member 70.

According to the embodiment, the mount engaging portions 64 are provided as projections projected at four locations at a face of the adapter housing 52 on the side of the sleeve inserting hole 58 and an engaging groove 64a is formed on the inner face side of the mount engaging portion 64.

Further, as shown by FIG. 6A and 6B, other face of the adapter housing 52 is provided with a projection for lamination 65 and an engaging portion for lamination 66 having shapes equivalent to those of a projection for adapter 76 and an engaging portion for adapter 77 of the mounting member 70 used in attachment and detachment to and from the adapter housing 52 which will be described later in details.

The projection for lamination 65 and the engaging portion for lamination 66 are for laminating a plurality of the optical connectors 10 by engaging with the adapter housing of other optical connector adapter attachably and detachably thereto and therefrom although details thereof will be described later.

Since the optical connector adapter 50 is constituted by the sleeve for optical connection 51 and the integrally molded adapter housing 52, the cost can be reduced by reducing the number of parts.

A comparison of dimensions and numbers of parts between the optical connector adapter 50 constituted in this way and the MU type optical connector adapter (JIS C5983 F14 type optical connector) of the related art is shown in Table 2 shown below.
(Table 2)

TABLE 2

|  | embodiment 1 | related art |
|---|---|---|
| total length (mm) | 13.6 | 26 |
| width (mm) | 4.5 | 10.4 |
| height (mm) | 4.0 | 7.5 |
| number of parts | 2 | 5 |

As shown by Table 2, a number of parts of the optical connector adapter 50 according to the embodiment is smaller than that of the MU type optical connector adapter of the related art and all of the total length, the width and height can be downsized. Thereby, downsizing of the optical connector 10 using the optical connector adapter 50 can be downsized and the high density formation can be achieved when the optical connector 10 is mounted to a mounting board.

Next, the mounting member 70 will be described in details.

As shown by FIG. 1 and FIG. 2C, the mounting member 70 is constituted by fixing portions 71 of bent both end portions having a channel-like shape formed by bending both end portions of a member in a shape of a flat plate and a base seat portion 72 at a region between the two mixing portions 71.

The fixing portion 71 is inserted into a fixing hole 101 provided to penetrate the mounting board 100 to hold and a front end portion thereof is constituted by a stepped difference portion 73 a width of which is wider than that of the side of the base seat portion 72 and wider than an inner diameter of the fixing hole 101.

Further, a front end face of the fixing portion 71 is formed by a taper face 74 to facilitate to be inserted into the fixing hole 101 and a notch portion 75 notched by a predetermined amount in a longitudinal from the front end is provided at substantially a central portion thereof in the width direction.

When the fixing portion 71 is inserted into the fixing hole 101 of the mounting board 100, the fixing portion 71 is inserted into the fixing hole 101 by bringing an edge portion of the fixing portion 71 into contact with the taper face 74 of the fixing portion 71 and elastically deforming the fixing portion 71 to narrow the width of the notch portion 75.

Further, the inserted fixing portion 71 is held by preventing the mounting member 70 from drawing from the fixing hole 101 by bringing the stepped difference portion 73 into contact with an opening edge portion of the fixing hole 101.

Further, the base seat portion 72 of the mounting member 70 is provided with a pair of projections for adapter 76 projected into the sleeve inserting hole 58 of the adapter housing 52 by being projected to a side opposed to the fixing portion 71 substantially at a central portion thereof and four adapter engaging portions 77 engaged with respectives of the engaging grooves 64a of the four mount engaging portions 64 of the adapter housing 52 at edge portions in the width direction of the base seat portion 72.

The projections for adapter 76 are provided to project to sides of both ends in the longitudinal direction of the sleeve inserting hole 58 of the adapter housing 52 and by bringing the projections for adapter 76 into contact with the both ends in the longitudinal direction of the sleeve inserting hole 58, movement of the adapter housing 52 in the axial direction of the optical fiber 1 is restricted relative to the mounting member 70.

Further, the adapter engaging portion 77 is formed to be projected to be inclined to the width to the width direction of the base seat portion 72 and by engaging the adapter engaging portion 77 to the engaging groove 64a of the mount engaging portion 64, the adapter engaging portion 77 is held by restricting movement of the adapter housing 52 in the width direction and the attaching and detaching direction relative to the mounting member 70 of the adapter housing 52.

That is, when a face of the adapter housing 52 provided with the sleeve inserting hole 58 is brought into contact with the base seat portion 72 of the mounting member 70, the adapter engaging portion 77 of the mounting member 70 is engaged with the mount engaging portion 64 of the adapter housing 52, the movement in the width direction and the attaching and detaching direction is restricted, the pair of projections for adapter 76 provided at the base seat portion 72 are projected into the sleeve inserting hole 58 of the adapter housing 52, thereby, the adapter housing 52 is held by restricting the movement in the longitudinal direction.

Further, since the inner faces of the engaging grooves 64a of the mount engaging portions 64 are formed by the inclined faces and the adapter engaging portions 77 are formed to be inclined, the mounting member 70 and the optical connector adapter 50 can be attached and detached to and from each other by being pressed or drawn by predetermined force.

Such a mounting member 70 can be formed by, for example, metal pressing.

As a method of integrating the optical connector constituted by the optical connector plug, the optical connector adapter and the mounting member, first, the mounting member 70 is fixed to the mounting board 100. Next, the optical connector plugs 20 are fixed to the both sides of the optical connector adapter 50 to thereby optically connect the optical connector plugs 20. Thereafter, by fixing the optical connector adapter 50 fixed with the optical connector plugs 20 to the mounting member 70, the optical connector 10 optically connecting the optical fibers 1 can be mounted to the mounting board 100.

Further, in order to disengage the optical connector plug of the optical connector mounted to the mounting board 100 in this way, the optical connector plug 20 may be disengaged from the optical connector adapter 50 after disengaging the optical connector adapter 50 fixed with the optical connector plugs 20 from the mounting member 70.

By making the mounting member attachable and detachable to and from the optical connector adapter 50, the optical connector adapter 50 can be attached and detached thereto and therefrom after fixing the mounting member 70 to the mounting board 100 and therefore, it is not necessary to engage the optical connector adapter 50 and the optical connector plug 20 on the mounting board 100 and it is not necessary to provide a space for attaching and detaching the optical connector adapter 50 to and from the optical connector plug 20 at the mounting board 100. Thereby, not only the mounting board 100 can be downsized but also mounting of the optical connector 10 can easily be carried out.

Figure 7:
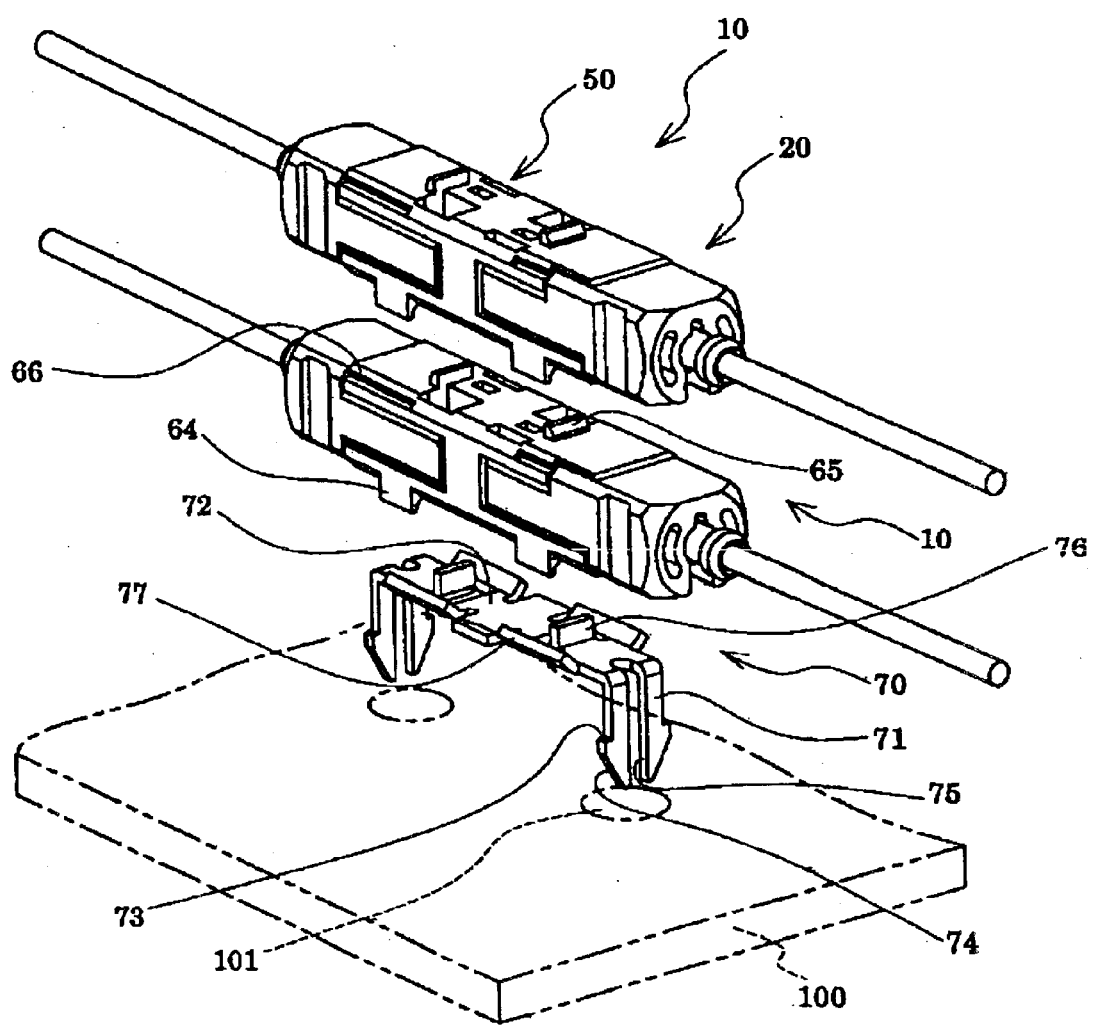
FIG. 7 is a perspective view showing a step of mounting to laminate the optical connectors according to Embodiment 1 of the invention.
Figure 8:
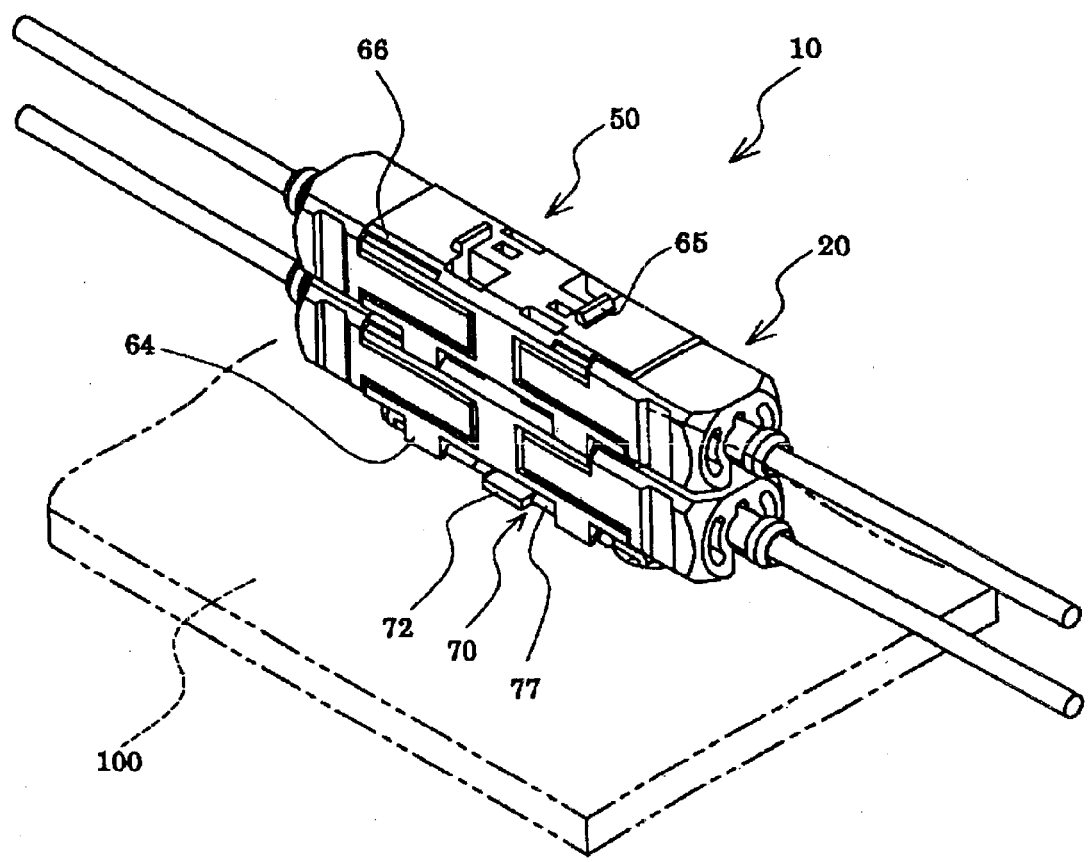
FIG. 8 is a perspective view showing a state of mounting to laminate the optical connector according to Embodiment 1 of the invention.
Figure 9A:
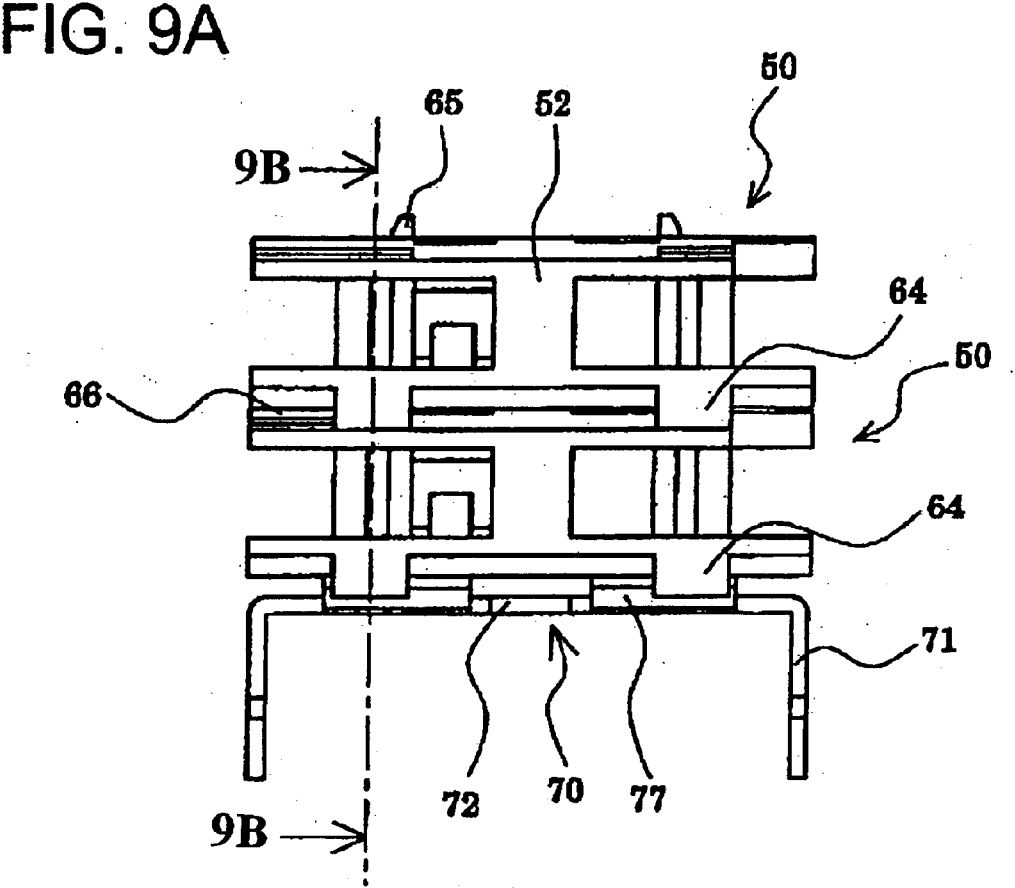
FIGS. 9A and 9B are a plane view and a sectional view showing a state of mounting to laminate the optical connectors according to Embodiment 1 of the invention.
Figure 9B:
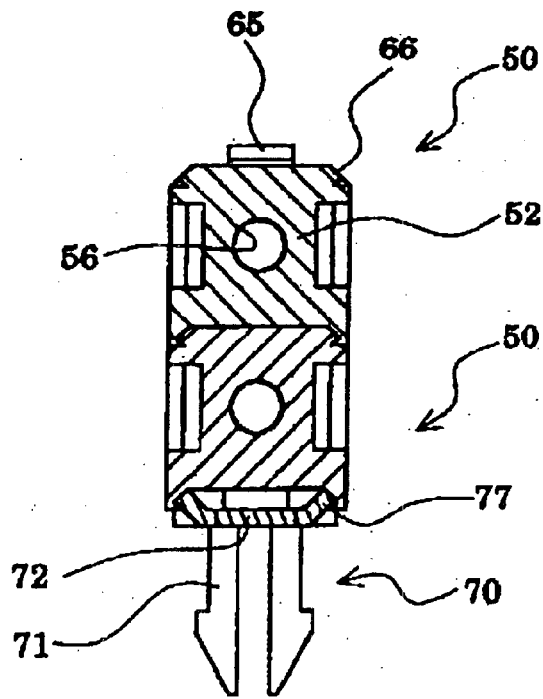

Here, FIG. 7 is a perspective view showing a step of mounting to laminate optical connectors, FIG. 8 is a perspective view showing a state of mounting to laminate optical connectors and FIGS. 9A and 9B are a plane view showing a state of mounting to laminate optical connectors and a sectional view taken along a line 9B—9B thereof.

The projection for lamination 65 and the engaging portion for lamination 66 are provided at a face of the adapter housing 52 of the optical connector adapter 50 on a side opposed to the mount engaging portion 64.

As shown by FIGS. 5A, 5B and 5C and FIGS. 6A and 6B, the projection for lamination 65 is provided with a shape equivalent to that of the projection for adapter 76 of the mounting member 70 and projected into the sleeve inserting hole 58 of other of the optical connector adapter 50 to thereby prevent the other optical connector adapter 50 from moving in the longitudinal direction relative to the optical connector adapter 50.

Further, the engaging portion for lamination 66 is formed to project by forming the groove along an outer peripheral edge portion to be engaged with the mount engaging portion 64 of the other optical connector adapter 50. By engaging the engaging portion for lamination 66 with the mount engaging portion 64 of the other optical connector adapter 50, the other optical connector adapter is held attachably and detachably to and from the optical connector adapter 50.

By providing the projection for lamination 65 and the engaging portion for lamination 66 for engaging with the optical connector adapter 50 at the face of the optical connector adapter 50 on the side opposed to the mount engaging portion 64 in this way, a plurality of the optical connector adapters 50 can be laminated, it is not necessary to align a plurality of the optical connectors 10 on the mounting board 100 in the face direction and downsizing can be achieved by narrowing the mounting area of the mounting board 100.

Here, a comparison of the total lengths and mounting densities of the optical connector 10 according to Embodiment 1 and the MU type optical connector plug (JIS C5983 F14 type optical connector) of the related art is shown in Table 3, shown below. Further, the mounting density shown in Table 3, shown below, is constituted by fixing the optical connector plugs 20 on the both sides of the optical connector adapter and is a relative value by constituting a reference by the MU type optical connector of the related art.

TABLE 3

|  | embodiment 1 | related art (nonpatent literature 1) |
| --- | --- | --- |
| total length | 1/3 | 1 |
| mounting density (width direction) | 2 or more | 1 |
| mounting density (height direction) | 2 | 1 |

As shown by Table 3, according to the optical connector 10 of the embodiment, the mounting density twice or more as much as that of the MU type optical connector plug of the related art in the width direction and the mounting density twice as much as that of the MU type optical connector plug of the related art in the height direction can be realized. Further, since the total length of the optical connector 10 of the embodiment can be made 1/3 of that of the MU type optical connector of related art, also the mounting density in the longitudinal direction of the embodiment can be three times as much as that of the MU type optical connector of the related art. Further, in the longitudinal direction, engagement and disengagement of the optical connector plug 20 and the optical connector adapter 50 can be carried out by a narrow area and therefore, a substantial mounting density of the embodiment can be made three times as much as that of the MU type optical connector of the related art.

Embodiment 2

Figure 10:
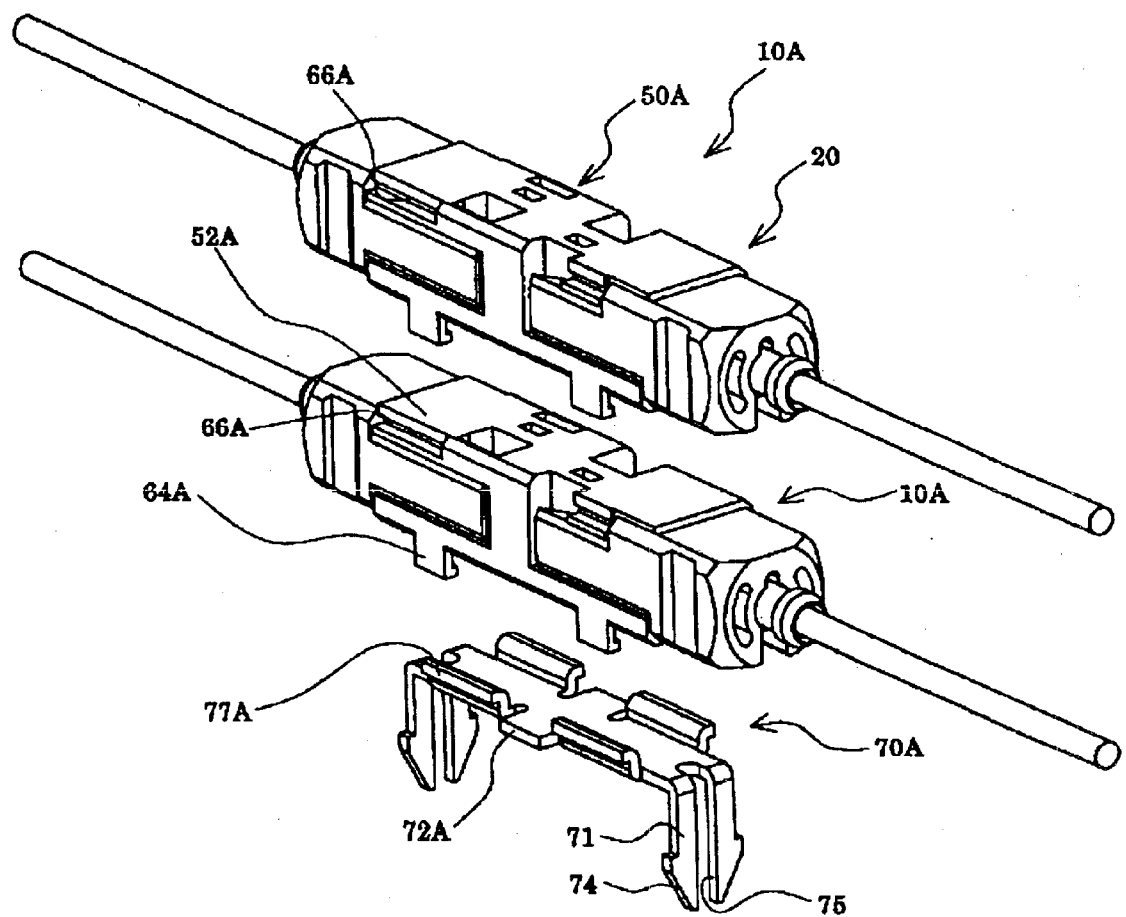
FIG. 10 is a perspective view showing a step of mounting to laminate optical connectors according to Embodiment 2 of the invention.
Figure 11:
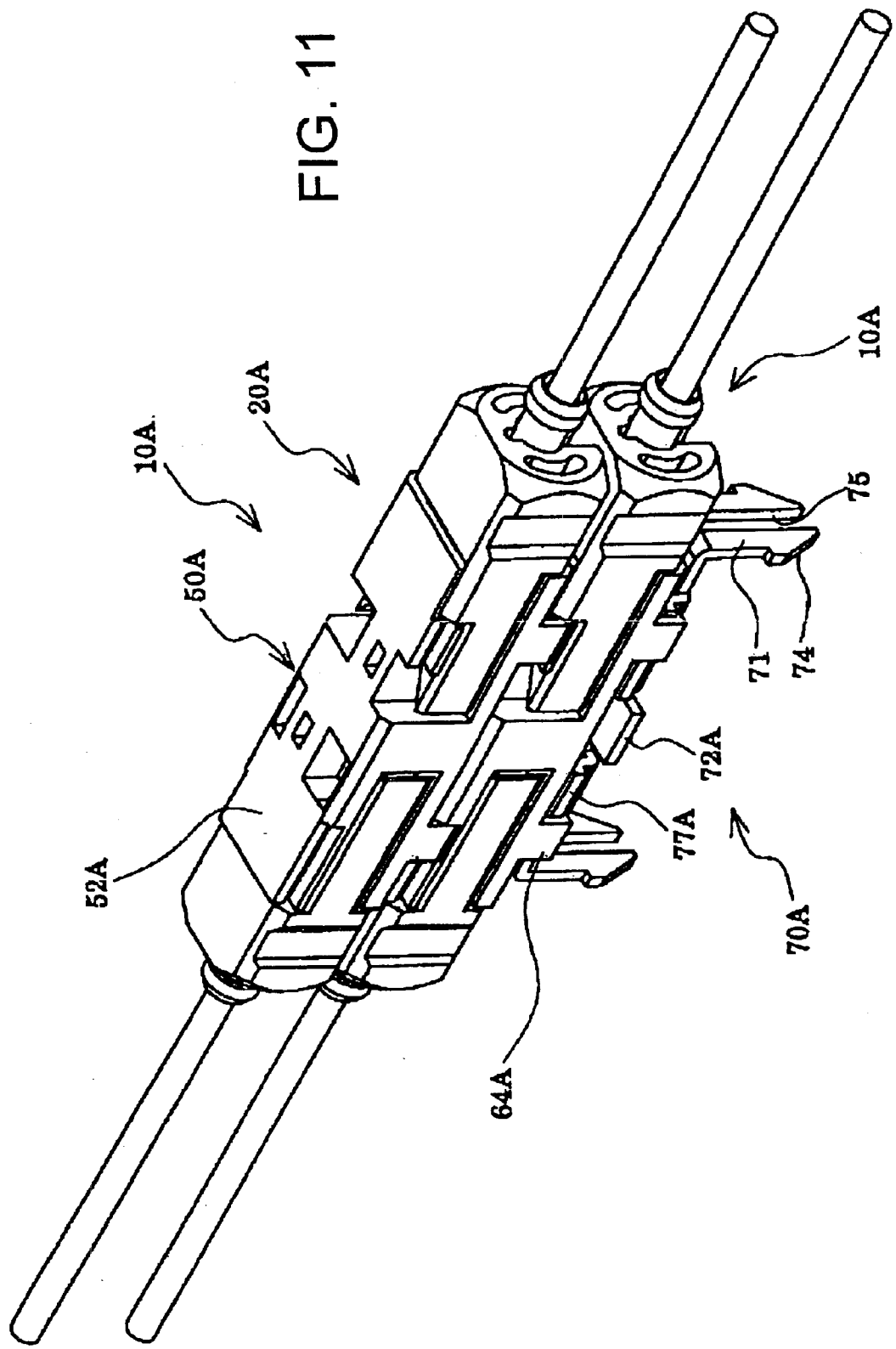
FIG. 11 is a perspective view showing a state of mounting to laminate the optical connectors according to Embodiment 2 of the invention.

FIG. 10 is a perspective view showing a step of mounting to laminate optical connectors according to Embodiment 2 and FIG. 11 is a perspective showing a state of mounting to laminate optical connecters according to Embodiment 2. Further, members similar to those of Embodiment 1, mentioned above, are attached with the same notations and duplicated explanation thereof will be omitted.

As shown by FIG. 10 and FIG. 11, an optical connector 10A is provided with the optical connector plug 20, an optical connector adapter 50A and a mounting member 70A.

The mounting member 70A comprises the bent portion 71 and a base seat portion 72A and adapter engaging portions 77A are provided at edge portions on both sides in a width direction of the base seat portion 72A.

The adapter engaging portions 77A are formed to bend to project to a side opposed to the bent portion 71 and formed such that front end portions thereof are bent to both sides in the width direction to constitute directions the same as directions of the face of the base seat portion 72A.

An adapter housing 52A of the optical connector adapter 50A engaged with the mounting member 70A is provided with a mount engaging portion 64A projected to a side of the sleeve inserting hole 58.

The mount engaging portion 64A is provided to project to the side of the mounting member 70A and a front end portion thereof is formed in a shape projected to an inner side.

The optical connector adapter 50A and the mounting member 70A can engage the mount engaging portion 64A and the adapter engaging portion 77A by sliding to move in a state in which a face of the adapter housing 52A on the side of the sleeve inserting hole 58 is brought into contact with the base seat portion 72A of the mounting member 70A.

Further, a face of the mount engaging portion 64A of the adapter housing 52A on a side opposed to the mount engaging portion 64A is provided with a lamination engaging portion 66A in a groove-like shape to be engaged with the mount engaging portion 64A of other of the optical connector adapter 50A.

The optical connectors 10A can be mounted to laminate on the mounting board 100 by attachably and detachably laminating a plurality of the optical connector adapters 50A by the lamination engaging portions 66A.

In this way, according to the embodiment, the optical connector adapter 50A is moved to slide to engage with the mounting member 70A to thereby make the optical connector adapter 50A and the mounting member 70A attachable and detachable to and from each other and thereby, similar to Embodiment 1, mentioned above, attachment and detachment of the optical connector adapter 50A to and from the optical connector plug 20A can be facilitated to execute and the mounting board 100 can be downsized.

Embodiment 3

Figure 12:
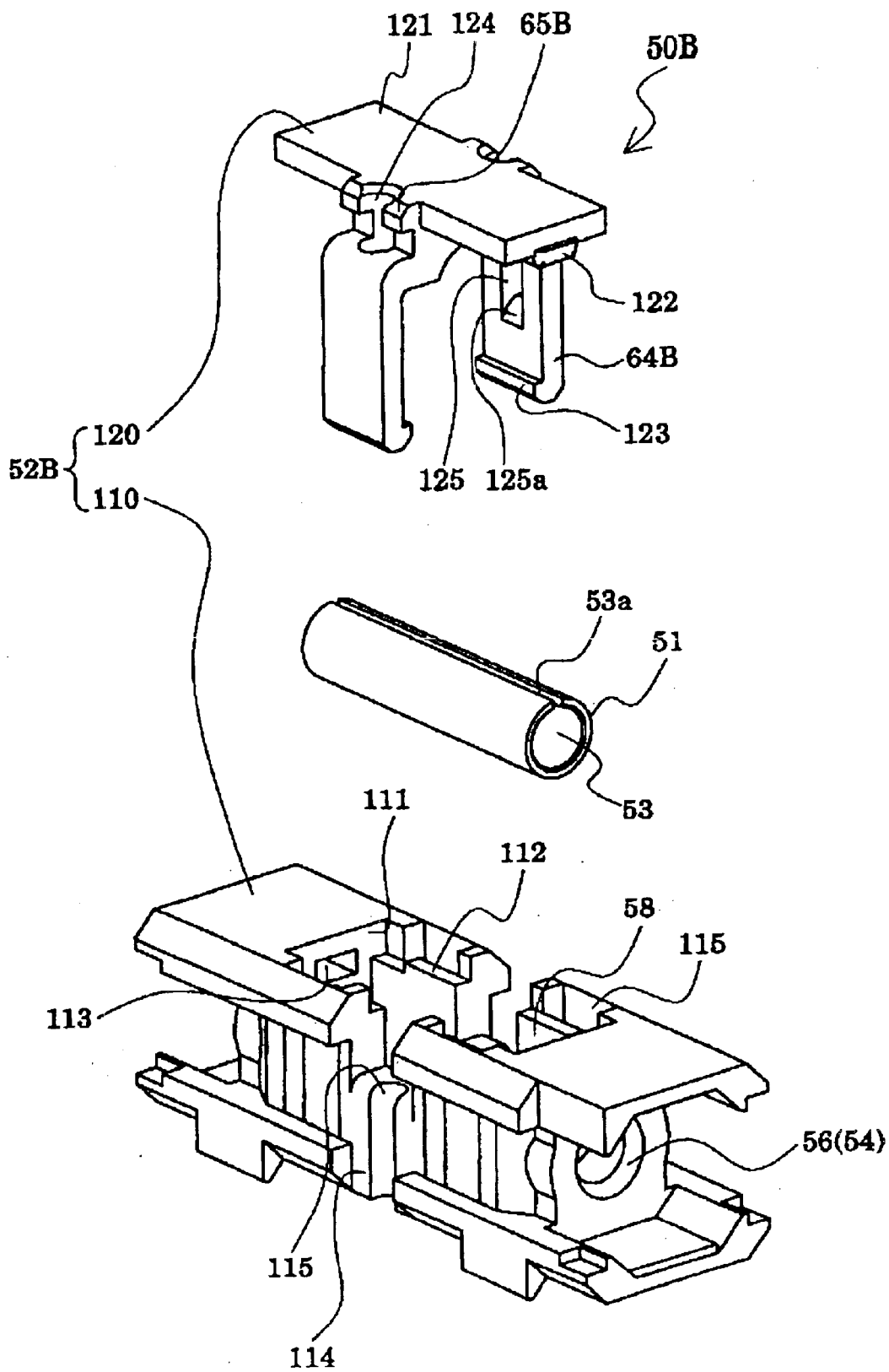
FIG. 12 is a perspective view showing a step of integrating an optical connector adapter according to Embodiment 3 of the invention.
Figure 13A:
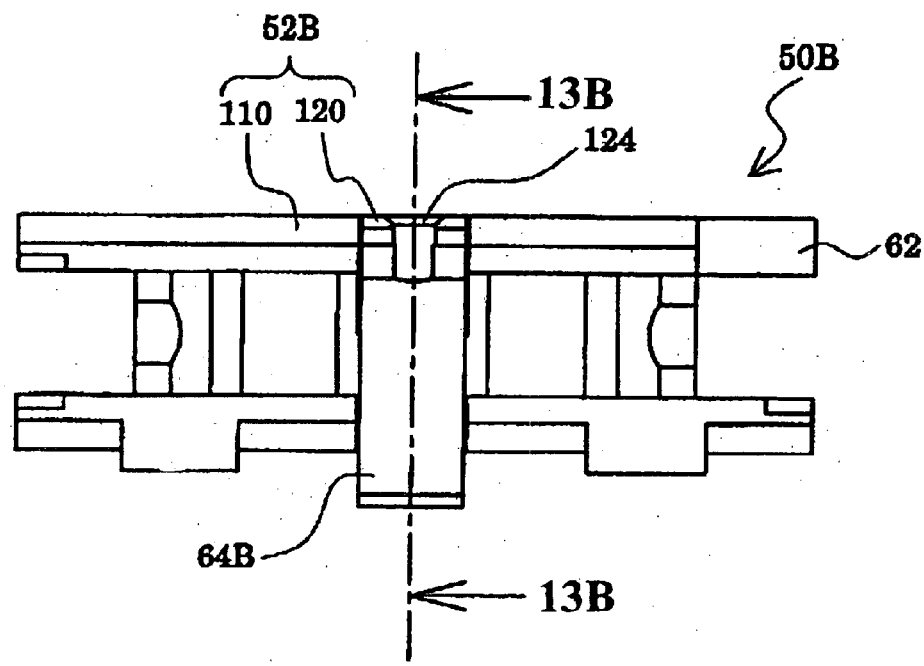
FIGS. 13A and 13B are a plane view and a sectional view of the optical connector adapter according to Embodiment 3 of the invention.
Figure 13B:
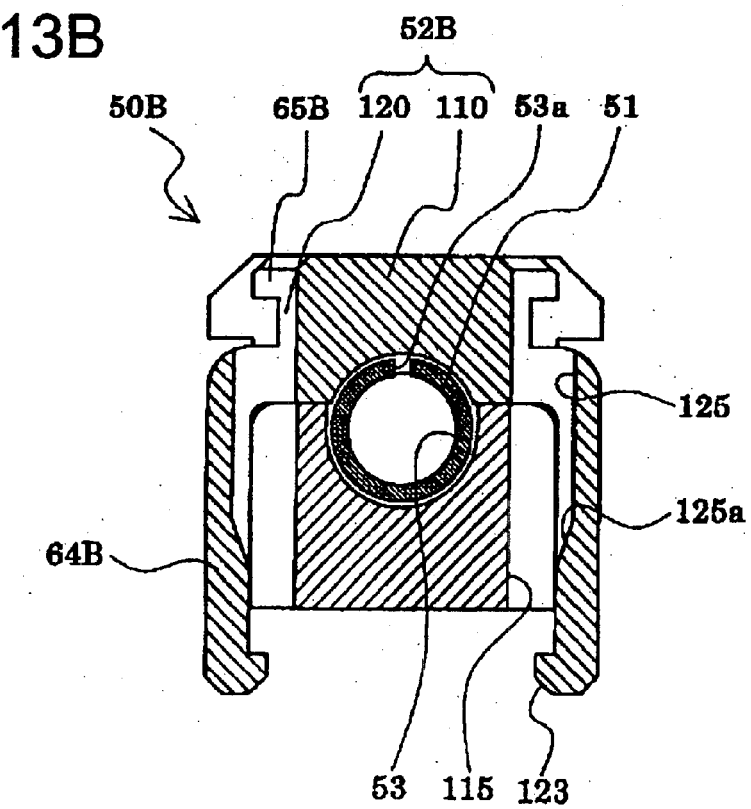

FIG. 12 is a perspective view showing a step of integrating an optical connector adapter according to Embodiment 3 and FIGS. 13A and 13B are a plane view of the optical connector adapter and a sectional view taken along a line 13B—13B thereof. Further, members similar to those of Embodiments 1 and 2, mentioned above, are attached with the same notations and a duplicated explanation thereof will be omitted.

As shown by FIG. 12 and FIGS. 13A and 13B, an optical connector adapter 50B of the embodiment is provided with the sleeve for optical connection 51 inserted with a front end portion of a cylindrical member for ferrule and an adapter housing 52B including the sleeve for optical connection 51 and an adapter housing 52B and is constituted by a housing main body 110 provided with a sleeve inserting hole 58B inserted with the sleeve for optical connection 51 and opened at one face thereof and a lid member 120 fitted to the sleeve inserting hole 58B of the housing main body 110.

The housing main body 110 is formed by, for example, integrally molding, a resin of plastic or the like and is provided with the through hole 54 penetrated in the axial direction similar to Embodiment 1, as described above.

The through hole 54 includes a sleeve holding portion (not illustrated) holding the sleeve for optical connection 51 substantially on the central side and the through holes 56 inserted with the cylindrical members for ferrule on sides of both ends of the sleeve holding portion and a stepped difference portion (not illustrated) is provided by a difference between inner diameters of the sleeve holding portion and the through hole 56.

Further, the housing main body 110 is provided with the sleeve inserting hole 58B formed by a size substantially equivalent to the sleeve holding hole for communicating the sleeve holding hole and outside at the one face. A portion of an opening side of the sleeve inserting hole 58B constitutes a fitting portion 111 larger than the sleeve holding portion such that the lid member 120 is fitted thereto and the fitted lid member 120 is not inserted up to the sleeve holding portion and there is provided a stepped difference portion for lid 112 brought into contact with the lid member 120 by the fitting portion 111 for restricting movement of the sleeve holding portion of the lid member 120 to the sleeve holding portion.

Further, a pair of fixing recess portions 113 for engaging with fixing projections 122 of the lid member 120 at side faces thereof opposed to each other are provided at inner faces of the fitting portions 111 of the housing member 110.

Further, two side faces of the housing main body 110 are provided with recess portions for insertion 114 into which mount engaging portions 64B of the lid member 120 are inserted to guide when the lid member 120 is fitted to the fitting portion 111 which will be described later in details.

Further, the housing main body 110 is provided with a plug releasing insertion hole 115 to be inserted with a plug releasing jig, described later in more detail, at a region in correspondence with the locking claw 39 of the claw portion 40 of the optical connector plug 20 when the housing main body 110 is engaged with the optical connector plug 20 of Embodiment 1, as described above.

The plug releasing insertion hole 115 is opened to the stepped difference portion for lid 112 provided by the fitting, portion 111 and is not closed when the lid member 120 is fitted to the fitting portion 111.

Meanwhile, the lid member 120 is formed by, for example, integrally molding a resin of plastic or the like similar to the housing main body 110 and is constituted by a lid portion 121 fitted to the fitting portion 111 and brought into contact with the stepped difference portion for lid 112 and is constituted by the mount engaging portion 64B projected from a side of the face opposed to a face provided with the fitting portion 111 of the housing main body 110.

The lid portion 121 is provided with fixing projection portions 122 respectively projected into the pair of fixing recess portions 113 when the lid portion 121 is fitted to the fitting portion 111 of the housing main body 110.

Further, the lid portion 121 is provided with a projection for lamination 65B engaged with the mount engaging portion 64B of other of the optical connector adapter 50B.

The lid portion 121 is provided to project with the pair of mount engaging portions 64B integrally formed therewith from a bottom face side. The mount engaging portion 64B is provided to project by a predetermined amount from a face opposed to a face of the housing main body 110 provided with the fitting portion 111 by being inserted into the insertion recess portion 114 of the housing main body 110 when the lid member 120 is fitted to the fitting portion 111 of the housing main body 110.

At inner faces of front end portions of the pair of mount engaging portions 64B opposed to each other, there are provided mount engaging projections 113 to be engaged with a mounting member or other of the adapter holding 52B.

Further, the lid portion 121 is provided with jig inserting holes 124 for inserting a mount engagement releasing jig having a shape of a pin for releasing engagement between the mount engaging portion 64B and the mounting member or other of the adapter housing 52B, described later in details in correspondence with respectives of the pair of mount engaging portions 64B.

The jig inserting hole 124 is arranged on the inner face side of each of the mount engaging portions 64B and the inner face of the mount engaging portion 64B is provided with a recess portion for inserting jig 125 to be inserted with mount engagement releasing jig continuous to the inserting hole 123.

A taper face 125a is constituted on a side of a front end portion of the mount engaging portion 64B of the jig inserting recess portion 125 of the mount engaging portion 64B and when the mount engagement releasing jig is inserted into the jig inserting hole 124 of the lid member 120, a front end of the mount engagement releasing jig is brought into contact with the taper face 125a of the jig insertion recess portion 125, the taper face 125a is pushed to widen by pushing the mount engagement releasing jig further and the mount engaging portions 64B are elastically deformed in directions remote from each other.

Further, the recess portion for insertion 114 of the housing main body 110 to be fitted with the lid member 120 is provided with a jig guiding recess portion 115 to be inserted with a front end of the mount engagement releasing jig inserted into the jig inserting hole 124 and the mount engagement releasing jig is guided by the jig guiding recess portion 115.

According to the optical connector adapter 50B having such a constitution, since the mount engaging portion 64B provided at the lid member 120 fitted with one face of the housing main body 110 is provided to project from other face of the housing member 110, the mount engaging portion 64B can be prolonged to facilitate elastic deformation. Therefore, the mount engaging portion 64B can be prevented from being cracked or broken in engaging and disengaging the optical connector adapter 50B to and from the mounting member or other of the optical connector adapter 50B by the mount engaging portion 64.

Here, the optical connector 10B using the optical connector adapter 50B will be explained. Further, FIG. 14 is a perspective view showing a state of connecting the optical connector according to Embodiment 3 and the plug releasing jig.

Here, the optical connector plug 20 used in the optical connector 10B along with the optical connector adapter 50B of the embodiment is similar to that of Embodiment 1, mentioned above, and therefore, a duplicated explanation thereof will be omitted.

Figure 14:
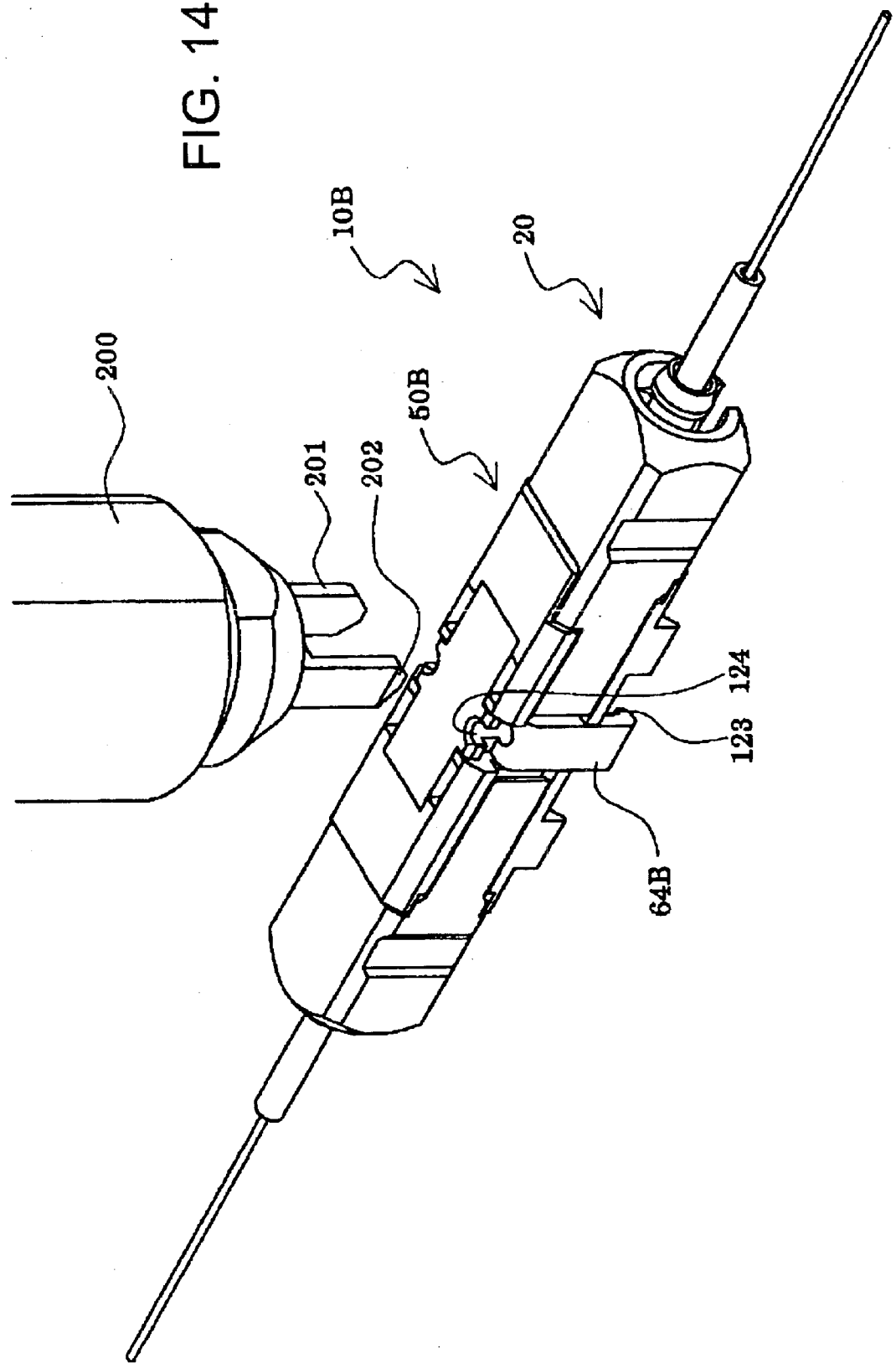
FIG. 14 is a perspective view showing a state of connecting the optical connector and a plug releasing jig according to Embodiment 3 of the invention.

As shown by FIG. 14, the optical connector plug 20 and the, optical connector adapter 50B of the optical connector 10B are engaged with each other similar to Embodiment 1, described above.

Further, the engagement is released by the adapter releasing jig 200.

Here, the adapter releasing jig 200 is provided with releasing portions 201 comprising a shape of a pair of flat plates inserted into the plug releasing inserting holes 115 of the adapter housing 52B at a front end thereof and a front end of the releasing portion 201 constitutes a taper portion 202 a thickness of which is gradually reduced.

When the releasing portions 201 having the taper portions 202 are inserted into the plug releasing inserting holes 115, the releasing portions 201 are interposed between the locking claws 39 and the adapter housing 52B while pushing to widen to elastically deform the claw portions 40 of the optical connector plug 20 to thereby release-engagement between the optical connector plug 20 and the optical connector adapter 50B.

Further, an explanation will be given of mounting the optical connector 10B to a mounting board.

Figure 15:
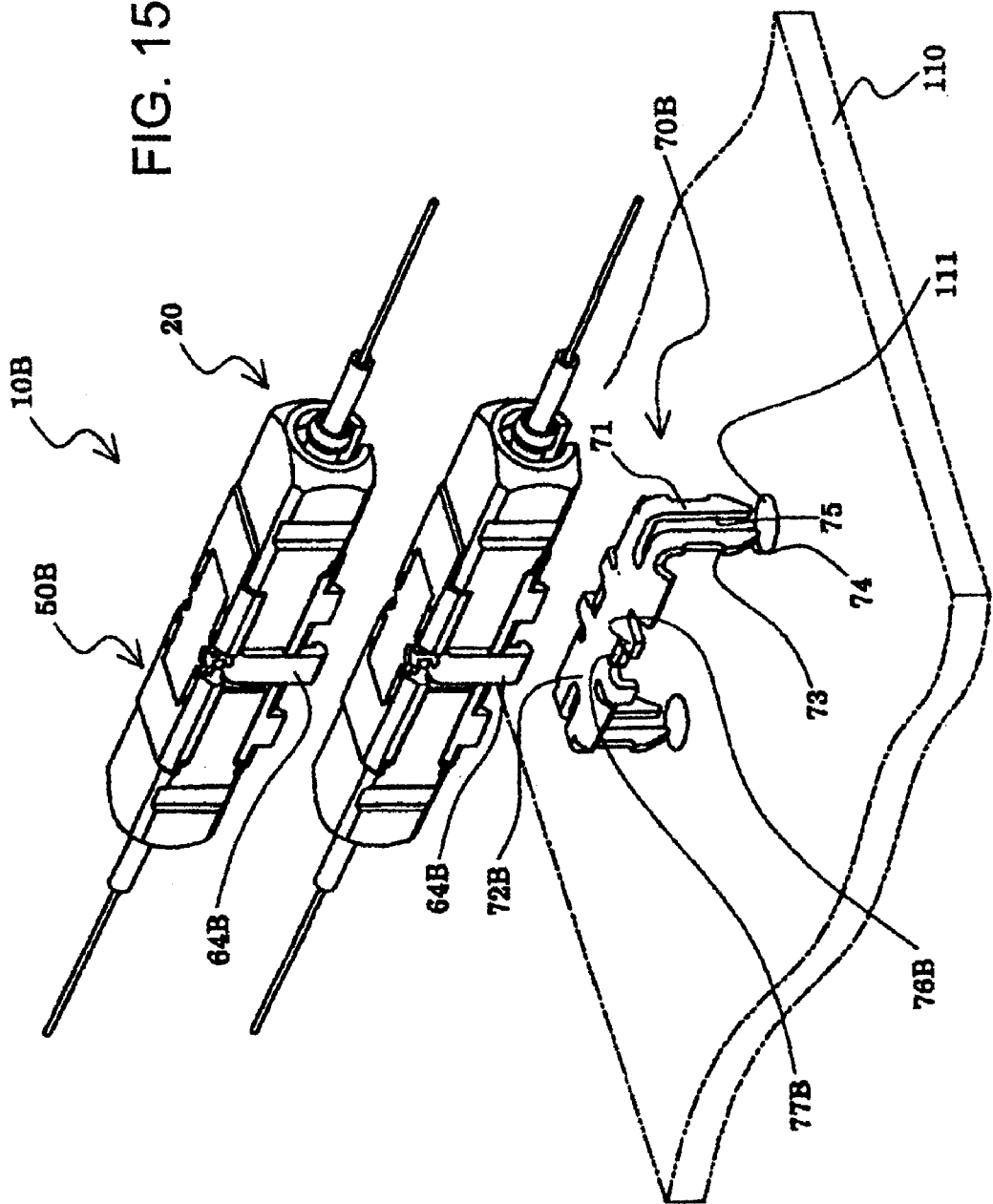
FIG. 15 is a perspective view showing a step of mounting to laminate the optical connectors according to Embodiment 3 of the invention.
Figure 16:
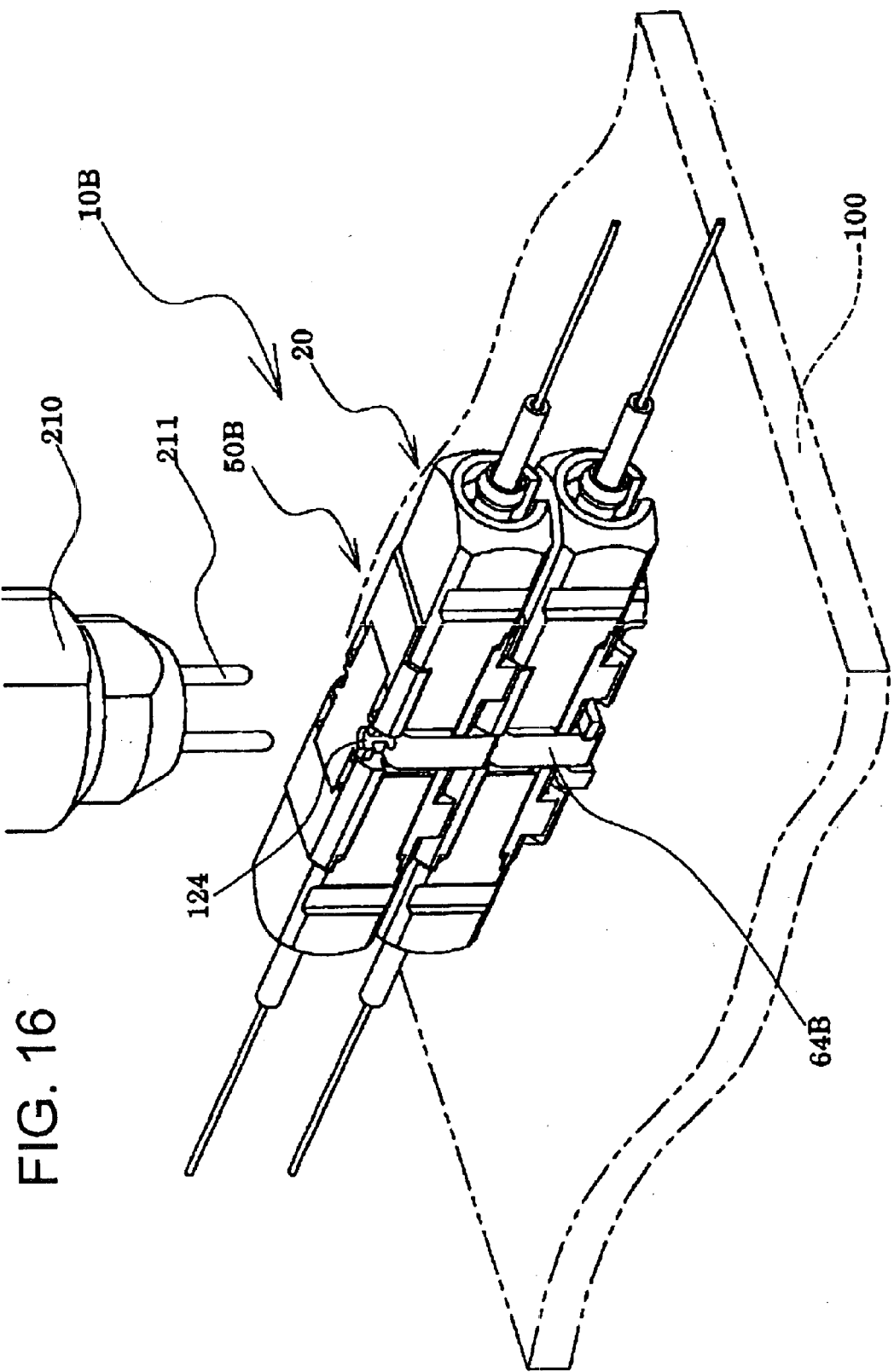
FIG. 16 is a perspective view showing a state of mounting to laminate the optical connectors and a mount releasing jig according to Embodiment 3 of the invention.

FIG. 15 is a perspective view showing a step of mounting to laminate the optical connector according to Embodiment 3 and FIG. 16 is a perspective view showing a state of mounting to laminate the optical connector according to Embodiment 3 and the mounting releasing jig. Further, members similar to those of Embodiments 1 and 2, mentioned above, are attached with the same notations and a duplicated explanation thereof will be omitted.

As shown by FIG. 15, a mounting member 70B to be mounted on the mounting board 100 is constituted by fixing portions 71 at the two bent end portions and a base seat portion 72B at a region between the two fixing portions 71.

The base seat portion 72B is provided with an adapter engaging portion 77B with which the mount engaging portion 64B of the optical connector adapter 50B is engaged and projections for adapter 76B on both sides of the adapter engaging portion 77B.

By bringing the projections for adapter 76B into contact with the mount engaging portions 64B engaged with the adapter engaging portion 77B, the optical connector 10B is restricted from moving in the axial direction of the optical fiber 1 relative to the mounting member 70B.

The optical connector 10B is fixed attachably and detachably to and from the mounting member 70B via the mount engaging portions 64B.

Further, other of the optical connector 10B is laminated on the optical connector 10B fixed to the mounting member 70B via the mount engaging portions 64B.

In details, the optical connector 10B is laminated with other of the optical connector 10B by engaging the mount engaging portions 64B of the other optical connector 10B with the projections for lamination 65B provided at the lid member 120 of the optical connector 10B on the mounting member 70B.

Further, engagement of the laminated optical connectors 10B and engagement of the optical connector 10B with the mounting member 70B can be released by the mount releasing jig 210 shown in FIG. 16.

The mount releasing jig 210 is provided with the pair of releasing portions 211 each having a shape of a pin inserted into the jig inserting holes 114 of the adapter housing 52B at a front end thereof.

When the releasing portions 211 of the mount releasing jig 210 are inserted into the jig inserting holes 124, as described above, the front ends of the releasing portions 210 push to open to elastically deform the mount engaging portions 64B and engagement of the optical connectors 10B or the optical connector 10B and the mounting member 70B is released.

In this way, the optical connector 10B of the embodiment can be downsized by reducing a number of parts and since the number of parts is reduced, releasing of the engagement between the optical connector plug 20 and the optical connector adapter 50B as well as releasing of engagement between the optical connectors 10B or between the optical connector 10B and the mounting member 70B can easily be carried out by using the adapter releasing jig 200 or the mount releasing jig 210. Further, according to the optical connector 10B mounted to the mounting board 100, releasing of engagement between the optical connector plug 20 and the optical connector adapter 50B as well as releasing of engagement between the optical connectors 10B or the optical connector 10B and the mounting member 70B are not carried out so frequently and therefore, the releasing is not troublesome even by the adapter releasing jig 200 or the mount releasing jig 210.

Although the invention has been explained by Embodiments 1 through 3 as described above, the optical connector of the invention is not limited to the above-described.

For example, according to Embodiments 1 through 3, mentioned above, the shape of the flange portion 29 and the shapes of the first rotation stopper portion 22 and the second rotation stopper portion 62 for restricting movement of the ferrule 21 in the rotating direction centering on the axis are not limited to those of Embodiments 1 through 3, mentioned above, for example, there may be constructed a constitution in which the flange portion is formed in a shape of a circular disk and provided with key grooves over the axial direction at four locations uniformly over the circumferential direction and the first rotation stopper portion and the second rotation stopper portion may be constituted by projections projected into the key grooves.

Moreover, so far as movement of the ferrule in the rotating direction can be restricted by the optical connector plug and the optical connector adapter, an effect similar to those of Embodiments 1 through 3as described above, can be achieved.

Further, although according to Embodiments 1 through 3, mentioned above, the mounting members 70 through 7 0B are provided with the bent portions 71 for engaging with the fixing holes 101 of the mounting board 100 and the mounting members 70, 70A through 70B are mounted on the mounting board 100, a method of mounting the mounting members 70, 70A through 70B on the mounting board 100 is not particularly limited thereto.

Figure 17:
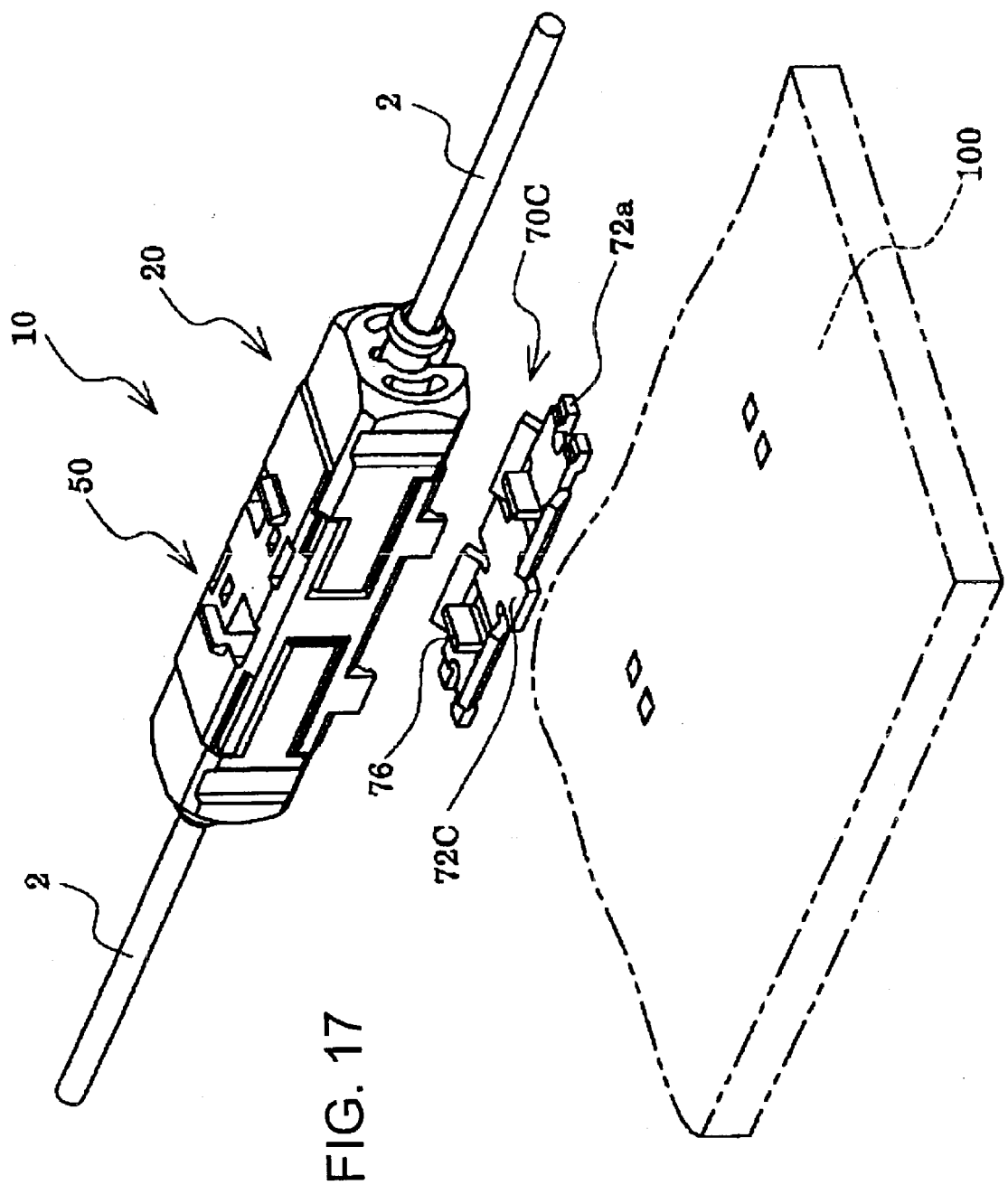
FIG. 17 is a perspective view showing a mounting step showing other example of a mounting member according to other embodiment of the invention.

Here, other example of a mounting member is shown in FIG. 17. Further, FIG. 17 is a perspective view showing a mounting step showing a modified example of the mounting member of Embodiment 1.

As shown by FIG. 17, a mounting member 70C is not provided with a bent portion and is constituted only by a base sheet portion 72C.

Fixing projections 72A projected in a face direction are provided on sides of both ends in the longitudinal direction of the base seat portion 72C and sides of bottom faces of the fixing projections 72a are bonded onto the mounting board 100.

Further, bonding of the fixing projection 72a and the mounting board 100 is not particularly limited but, for example, bonding can be carried out by adhesion via an adhering agent, brazing or soldering.

Also the mounting member 70C can be formed by metal pressing.

Further, although according to Embodiments 1 through 3, mentioned above, the optical connectors 10 through 10B are fixed attachably and detachably to and from the mounting board 100 via the mounting members 70 through 70B fixed thereto attachably and detachably, Embodiments 1 through 3 are not particularly limited thereto but, for example, in the case of the optical connector 10B having the mount engaging portions 64B according to Embodiment 3, the optical connector 10B may directly be fixed onto the mounting board 100. Even by such a constitution, the optical connector 10B can be fixed attachably and detachably to and from the mounting board 100 and cost can be reduced and downsizing can be achieved by reducing the number of parts of the optical connector, particularly, the number of parts of the optical connector adapter.

As has been explained above, according to the invention, respectives of the optical connector plug, the optical connector adapter and the mounting member are constituted by reducing the numbers of parts and therefore, the integrating step can be simplified and downsizing can be achieved by reducing the fabrication cost. Further, the reliability can be promoted without damaging the front end or the like of the optical fiber in attachment and detachment without restricting the number of times of attachment and detachment of the optical connector adapter and the optical connector plug. Further, since the optical connector adapter and the mounting member mounted to the mounting board are made to be attachable and detachable to and from each other and therefore, it is not necessary to carry out attachment and detachment of the optical connector adapter and the optical connector plug on the mounting board and downsizing of the mounting board can be achieved.

What is claimed is:

1. An optical connector plug comprising:
a ferrule having a cylindrical member for supporting an optical fiber and a flange member disposed at a rear end portion of the cylindrical member;
a biasing spring mounted on a rear end portion of the flange member of the ferrule; and
a plug housing for supporting therein the ferrule and the biasing spring and for engagement with an optical connector adapter to provide an optical connection between a first optical fiber supported by the cylindrical member of the ferrule and a second optical fiber of another ferrule, the plug housing having a longitudinal axis and a slit extending through an outer periphery of the plug housing along the longitudinal axis thereof to permit insertion therethrough of an optical fiber core of the optical fiber into the plug housing in a direction generally transverse to the longitudinal axis during assembly of the optical connector plug.

2. An optical connector plug according to claim 1; wherein the rear end portion of the flange member has an engaging portion for engagement with the plug housing; and wherein the plug housing has a hole for holding the ferrule in a state of being biased by the biasing spring toward a front end side of the plug housing in the direction of the longitudinal axis thereof by engagement between the biasing member and the engaging portion of the flange member, and a first rotation stopper portion for engagement with the flange member to restrict rotational movement of the ferrule relative to the plug housing.

3. An optical connector plug according to claim 2; wherein the first rotation stopper portion of the plug housing is formed on the plug housing to permit a change in relative position between the plug housing and the ferrule in a state in which the ferrule is pressed against the biasing spring.

4. An optical connector plug according to claim 1; wherein the flange member of the ferrule is supported by the plug housing to allow engagement between the ferrule and the optical connector adapter so as to restrict rotational movement of the ferrule relative to the optical connector adapter.

5. An optical connector plug according to claim 2; wherein the flange member has an outer periphery having a generally-rectangular cross-section; and wherein rotational movement of the ferrule is restricted by the first rotation stopper portion of the plug housing contacting two first surfaces of the outer periphery of the flange member and by two second surfaces of the outer periphery of the flange member opposite the two first surfaces thereof contacting the optical connector adapter.

6. An optical connector plug according to claim 1; wherein the flange member has a projection projecting from a circumference of an outer peripheral surface thereof for engagement with the biasing spring.

7. An optical connector plug according to claim 1; wherein the cylindrical member of the ferrule has an outer diameter of 1.25 mm.

8. An optical connector having the optical connector plug according to claim 1.

9. In combination: an optical connector adapter comprised of a tubular sleeve having opposite open ends each for receiving a ferrule supporting an optical fiber to bring front end surfaces of the ferrules into contact with each other to optically connect together the optical fibers, and an adapter housing supporting therein the sleeve and having a longitudinal axis, the sleeve having a slit extending between the opposite ends thereof for allowing the sleeve to be elastically deformed to facilitate insertion of the ferrules into the sleeve, and the adapter housing having a first engaging portion projecting from an outer peripheral surface portion thereof and means for restricting movement of the sleeve along the longitudinal axis of the adapter housing; and mounting means detachably engageable with the first engaging portion of the adapter housing for detachably mounting the adapter housing to a mounting board.

10. A combination according to claim 9; wherein the adapter housing comprises an integrally molded structure; and wherein the outer peripheral surface portion of the adapter housing has a hole for receiving the sleeve.

11. A combination according to claim 10; wherein the adapter housing has a projection disposed at an outer edge of an opening of the hole for preventing removal of the sleeve from the hole.

12. A combination according to claim 9; wherein the adapter housing has a second engaging portion for engaging the first engaging portion.

13. A combination according to claim 12; wherein the adapter housing has stacking means for stacking the adapter housing with at least one other adapter housing of another optical connector adapter.

14. A combination according to claim 9; wherein the adapter housing has a rotation stopper portion for engagement with an outer periphery of the ferrule for restricting rotational movement of the ferrule relative to the adapter housing.

15. An optical connector comprising the optical connector adapter according to claim 9.

16. An optical connector comprising: a ferrule having a cylindrical member for supporting an optical fiber and a flange member disposed at a rear end portion of the cylindrical member, the flange member having an engaging portion on a side of a rear end portion thereof; a biasing spring mounted on the rear end portion of the flange member of the ferrule and disposed in engagement with the engaging portion of the flange member; a plug housing supporting therein the ferrule and the biasing spring in a state in which the ferrule is biased toward a side of a front end of the plug housing by the biasing spring when the biasing spring is disposed in engagement with the engaging portion of the flange member, the plug housing having a longitudinal axis and a slit extending through an outer periphery of the plug housing along the longitudinal axis thereof to permit insertion therethrough of an optical fiber into the plug housing in a direction generally transverse to the longitudinal axis during assembly of the optical connector; and an optical connector adapter comprised of a tubular sleeve having at least one open end for receiving a front end of the cylindrical member of the ferrule, and an adapter housing supporting therein the sleeve, the adapter housing having connecting portions for removable integral connection with connecting portions of the plug housing and an engaging portion projecting from an outer peripheral surface portion of the adapter housing; and mounting means detachably engageable with the engaging portion of the adapter housing for detachably mounting the adapter housing to a mounting board.

17. An optical connector according to claim 16; wherein the plug housing has a first rotation stopper portion engaged with the flange member of the ferrule for restricting rotational movement of the ferrule relative to the plug housing; and wherein the adapter housing has a second rotation stopper portion engaged with the flange member of the ferrule for restricting rotational movement of the ferrule relative to the adapter housing.

18. An optical connector according to claim 17; wherein the flange member has an outer periphery having a generally-rectangular cross-section; and wherein rotational movement of the ferrule is restricted by the first rotation stopper portion of the plug housing contacting two first surfaces of the outer periphery of the flange member and by two second surfaces of the outer periphery of the flange member opposite the two first surfaces thereof contacting the second rotation stopper portion of the adapter housing.

19. An optical connector according to claim 16; wherein each of the plug housing and the adapter housing has restricting portions for restricting relative rotational movement between the plug housing and the adapter housing.

20. An optical connector comprising:
a pair of optical connector plugs each comprised of a ferrule having a tubular member for supporting an optical fiber and a flange member connected to a rear end portion of the tubular member, a biasing member mounted on a rear end portion of the flange member, and a plug housing supporting therein the ferrule and the biasing member, the plug housing having a longitudinal axis and a slit extending through an outer periphery of the plug housing along the longitudinal axis thereof to permit insertion therethrough of an optical fiber core into the plug housing in a direction generally transverse to the longitudinal axis during assembly of the optical connector plug; and
an optical connector adapter comprised of a tubular sleeve having opposite open ends each for receiving therein at least a front end portion of the ferrule of a respective one of the optical connector plugs to provide an optical connection between optical fibers supported by the tubular members of the ferrules.

21. An optical connector according to claim 20; wherein the optical connector adapter has an adapter housing supporting therein the sleeve, the adapter housing having an engaging portion projecting from an outer peripheral surface portion thereof; and further comprising mounting means detachably engageable with the engaging portion of the adapter housing for detachably mounting the adapter housing to a mounting board.

22. An optical connector according to claim 21; wherein the mounting means comprises a mounting member having a base, at least one first connecting portion extending from the base for detachable engagement with the engaging portion of the adapter housing, and at least one second connecting portion extending from the base for detachable engagement with the mounting board.

23. In combination: a plurality of optical connectors according to claim 20; and stacking means for stacking the optical connectors together.

24. A combination according to claim 23; further comprising mounting means for mounting the stacked optical connectors on a mounting board.

25. An optical connector according to claim 24; wherein the mounting means comprises a mounting member having a base, at least one first connecting portion extending from the base for detachable engagement with an engaging portion of the adapter housing of one of the optical connectors, and at least one second connecting portion extending from the base for detachable engagement with the mounting board.

* * * * *